United States Patent
Rajakumar

(10) Patent No.: US 11,843,597 B2
(45) Date of Patent: *Dec. 12, 2023

(54) AUTOMATED SCALABLE IDENTITY-PROOFING AND AUTHENTICATION PROCESS

(71) Applicant: Vercrio, Inc., Wilmington, DE (US)

(72) Inventor: Anthony Rajakumar, Fremont, CA (US)

(73) Assignee: Vercrio, Inc., Wilmington, DE (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/076,256

(22) Filed: Oct. 21, 2020

(65) Prior Publication Data

US 2021/0044584 A1  Feb. 11, 2021

Related U.S. Application Data

(63) Continuation-in-part of application No. 16/184,965, filed on Nov. 8, 2018, now Pat. No. 10,855,679, (Continued)

(51) Int. Cl.
*H04L 9/40* (2022.01)
*H04N 21/4415* (2011.01)
(Continued)

(52) U.S. Cl.
CPC .......... *H04L 63/0861* (2013.01); *G06V 40/40* (2022.01); *H04N 21/4415* (2013.01);
(Continued)

(58) Field of Classification Search
CPC ............ H04L 63/0861; H04L 61/4523; H04L 2101/622; H04L 63/123; G06V 40/40;
(Continued)

(56) References Cited

U.S. PATENT DOCUMENTS 6,636,973 B1 * 10/2003 Novoa ..................... G06F 21/32
340/5.82
6,644,557 B1 * 11/2003 Jacobs ..................... F24F 11/30
726/16

(Continued)

FOREIGN PATENT DOCUMENTS

WO   WO2016/033698 A1   3/2016

OTHER PUBLICATIONS

International Search Report and Written Opinion dated Jul. 31, 2017 in PCT Application No. PCT/US17/31576, filed May 8, 2017.

*Primary Examiner* — David Garcia Cervetti
(74) *Attorney, Agent, or Firm* — Paradice & Li LLP

(57) ABSTRACT

A process of confirming an originator of an electronic mail (email) includes receiving a request for verification of the identity of an alleged originator of the email, which may be sent from the actual originator of the email or a recipient of the email. The alleged originator of the email may be determined, e.g., by parsing the email to determine the name of the sender in the email. Verification is obtained from a biometric-enabled client that is associated with the send whether the email was in fact sent by the sender as well as confirmation of the identity of the sender based on a previously stored identity-proofed biometric.

20 Claims, 13 Drawing Sheets

Related U.S. Application Data which is a continuation of application No. 15/587,870, filed on May 5, 2017, now Pat. No. 10,148,649.

(60) Provisional application No. 62/338,114, filed on May 18, 2016.

(51) Int. Cl.
| | | |
|---|---|---|
| *H04N 21/4627* | (2011.01) | |
| *G06V 40/40* | (2022.01) | |
| *H04N 21/414* | (2011.01) | |
| *H04L 61/4523* | (2022.01) | |
| *H04L 101/622* | (2022.01) | |

(52) U.S. Cl.
CPC ..... *H04N 21/4627* (2013.01); *H04L 61/4523* (2022.05); *H04L 2101/622* (2022.05); *H04N 21/41407* (2013.01)

(58) Field of Classification Search
CPC ........... H04N 21/4415; H04N 21/4627; H04N 21/41407
See application file for complete search history.

(56) References Cited

U.S. PATENT DOCUMENTS

| | | | | |
|---|---|---|---|---|
| 6,657,538 | B1* | 12/2003 | Ritter | H04W 12/069 340/5.82 |
| 6,980,669 | B1* | 12/2005 | Uchida | G06V 40/40 713/186 |
| 7,039,221 | B1* | 5/2006 | Tumey | G07C 9/37 382/118 |
| 7,174,319 | B2 | 2/2007 | Johnson | |
| 7,881,957 | B1* | 2/2011 | Cohen | G06Q 30/08 |
| 8,005,697 | B1* | 8/2011 | Cohen | G06Q 30/08 705/7.35 |
| 8,024,211 | B1* | 9/2011 | Cohen | G06Q 10/06 705/7.14 |
| 8,170,897 | B1* | 5/2012 | Cohen | G06Q 10/06311 705/7.13 |
| 8,250,632 | B1* | 8/2012 | Staddon | G06F 16/9535 726/4 |
| 8,347,093 | B1* | 1/2013 | Ahmed | G06F 21/31 713/168 |
| 8,429,757 | B1 | 4/2013 | Cavage et al. | |
| 8,438,617 | B2* | 5/2013 | Brainard | G06F 21/31 726/5 |
| 8,484,294 | B1* | 7/2013 | Raneri | H04L 51/23 709/219 |
| 8,646,039 | B2* | 2/2014 | Bentley | H04L 63/08 713/168 |
| 8,782,264 | B2 | 7/2014 | Harrison | |
| 8,806,439 | B1* | 8/2014 | Asher | G06F 21/52 711/212 |
| 8,832,788 | B1* | 9/2014 | Gibson | G06F 21/40 726/28 |
| 8,856,879 | B2* | 10/2014 | Schechter | G06F 16/00 348/E7.071 |
| 8,869,241 | B2* | 10/2014 | Davis | G06F 21/316 726/5 |
| 8,950,001 | B2* | 2/2015 | Bentley | G06F 21/31 726/28 |
| 9,038,146 | B1* | 5/2015 | Desikan | G06Q 50/01 726/8 |
| 9,060,057 | B1* | 6/2015 | Danis | H04L 63/083 |
| 9,100,171 | B1* | 8/2015 | Peterson | H04L 63/062 |
| 9,203,826 | B1* | 12/2015 | Margolis | H04L 63/08 |
| 9,253,126 | B2* | 2/2016 | Gourevitch | H04L 51/04 |
| 9,253,199 | B2* | 2/2016 | Engert | H04L 51/212 |
| 9,277,049 | B1* | 3/2016 | Danis | H04M 3/54 |
| 9,450,957 | B1* | 9/2016 | Daniel | G06F 3/04817 |
| 9,531,707 | B1* | 12/2016 | Daniel | H04L 63/0861 |
| 9,544,309 | B1 | 1/2017 | Robinson et al. | |
| 9,584,530 | B1* | 2/2017 | Statica | H04L 9/0643 |
| 9,602,768 | B2* | 3/2017 | Akimoto | H04L 65/403 |
| 9,721,080 | B2* | 8/2017 | Moran | G06F 21/32 |
| 9,852,426 | B2* | 12/2017 | Bacastow | G06Q 20/40 |
| 9,866,394 | B2* | 1/2018 | Alkhalaf | G06F 3/03545 |
| 9,922,475 | B2* | 3/2018 | Patterson | G06F 21/31 |
| 10,193,616 | B1* | 1/2019 | Parr | H04W 88/04 |
| 10,275,590 | B2* | 4/2019 | Chakraborty | G06F 21/40 |
| 10,649,690 | B2* | 5/2020 | Kumar | G06F 3/0659 |
| 10,853,799 | B2* | 12/2020 | Kassemi | G06Q 10/107 |
| 2001/0034836 | A1 | 10/2001 | Matsumoto et al. | |
| 2001/0044900 | A1* | 11/2001 | Uchida | G06F 21/32 713/186 |
| 2002/0169855 | A1* | 11/2002 | Maehiro | H04L 51/00 709/219 |
| 2003/0115267 | A1* | 6/2003 | Hinton | G06F 21/41 709/204 |
| 2003/0204751 | A1* | 10/2003 | Jindani | H04L 63/102 726/28 |
| 2004/0041690 | A1* | 3/2004 | Yamagishi | G07C 9/00563 340/5.52 |
| 2004/0054885 | A1* | 3/2004 | Bartram | H04L 9/3265 709/204 |
| 2004/0131187 | A1* | 7/2004 | Takao | H04L 63/104 380/255 |
| 2005/0002531 | A1* | 1/2005 | Michaelsen | H04L 9/0618 380/268 |
| 2005/0054926 | A1* | 3/2005 | Lincoln | G06V 40/1306 600/443 |
| 2006/0000894 | A1* | 1/2006 | Bonalle | G06K 19/0718 235/382 |
| 2006/0106675 | A1* | 5/2006 | Cohen | G06Q 30/0601 705/37 |
| 2007/0011253 | A1* | 1/2007 | Taylor | H04L 51/48 709/206 |
| 2007/0050632 | A1* | 3/2007 | Matsuoka | G06F 21/88 713/182 |
| 2007/0050642 | A1* | 3/2007 | Flynn | G06F 12/1408 713/192 |
| 2007/0092112 | A1* | 4/2007 | Awatsu | G06V 40/10 340/5.52 |
| 2007/0120970 | A1* | 5/2007 | Goffin | H04N 21/4223 348/E7.081 |
| 2007/0192592 | A1* | 8/2007 | Goettfert | G06F 21/79 713/162 |
| 2007/0192858 | A1* | 8/2007 | Lum | H04L 63/20 726/22 |
| 2007/0282887 | A1* | 12/2007 | Fischer | G06F 16/954 707/999.102 |
| 2008/0046723 | A1* | 2/2008 | Weber | G07C 9/33 713/159 |
| 2008/0101605 | A1* | 5/2008 | Kitamura | H04N 21/23116 380/239 |
| 2008/0120421 | A1* | 5/2008 | Gupta | H04L 65/1096 709/239 |
| 2008/0120692 | A1* | 5/2008 | Gupta | H04L 65/1096 726/1 |
| 2008/0130962 | A1* | 6/2008 | Lee | G06V 40/169 382/118 |
| 2008/0279425 | A1* | 11/2008 | Tang | G06V 40/16 382/118 |
| 2008/0289020 | A1* | 11/2008 | Cameron | H04L 9/3247 726/9 |
| 2008/0320572 | A1* | 12/2008 | Connell, II | G06Q 30/00 726/6 |
| 2009/0041307 | A1* | 2/2009 | Iwano | G16H 40/67 382/115 |
| 2009/0116703 | A1* | 5/2009 | Schultz | H04L 9/3231 382/118 |
| 2009/0138405 | A1* | 5/2009 | Blessing | H04L 63/1466 705/67 |
| 2009/0138711 | A1* | 5/2009 | Heimbigner | H04L 51/212 713/176 |
| 2009/0192968 | A1* | 7/2009 | Tunstall-Pedoe | G06N 5/02 706/53 |

(56) References Cited

U.S. PATENT DOCUMENTS

| | | | | |
|---|---|---|---|---|
| 2009/0232367 A1* | 9/2009 | Shinzaki | G06V 40/1394 | 382/124 |
| 2009/0278492 A1* | 11/2009 | Shimizu | H02J 7/0048 | 320/108 |
| 2009/0327709 A1* | 12/2009 | Garner | G06F 21/75 | 713/162 |
| 2010/0023371 A1* | 1/2010 | Hartz | G06Q 30/0601 | 705/26.1 |
| 2010/0115114 A1* | 5/2010 | Headley | H04L 51/52 | 709/229 |
| 2010/0266169 A1* | 10/2010 | Abiko | G06V 40/1335 | 382/115 |
| 2010/0306854 A1* | 12/2010 | Neergaard | G06F 21/6254 | 726/26 |
| 2010/0332392 A1* | 12/2010 | Ueno | G06Q 20/40 | 340/5.82 |
| 2011/0055592 A1* | 3/2011 | Teuwen | G06F 21/121 | 713/190 |
| 2011/0200237 A1* | 8/2011 | Nakamura | A61B 5/1172 | 382/115 |
| 2011/0219173 A1* | 9/2011 | Morita | G06F 21/79 | 711/E12.091 |
| 2011/0246787 A1* | 10/2011 | Farrugia | G09C 1/00 | 713/189 |
| 2011/0307403 A1* | 12/2011 | Rostampour | G06Q 50/265 | 705/325 |
| 2012/0159043 A1* | 6/2012 | Yeh | G06F 11/1068 | 711/E12.001 |
| 2012/0167174 A1* | 6/2012 | Saxena | H04L 69/00 | 709/206 |
| 2012/0192250 A1* | 7/2012 | Rakan | H04L 9/3231 | 726/2 |
| 2013/0028488 A1* | 1/2013 | Abe | G06V 10/993 | 382/115 |
| 2013/0029648 A1* | 1/2013 | Soundrapandian | H04M 1/72412 | 455/41.1 |
| 2013/0036314 A1* | 2/2013 | Glew | G06F 21/86 | 713/194 |
| 2013/0067545 A1* | 3/2013 | Hanes | H04L 9/3231 | 726/6 |
| 2013/0074194 A1* | 3/2013 | White | H04L 51/56 | 726/28 |
| 2013/0086393 A1* | 4/2013 | Pogmore | G06F 16/81 | 713/189 |
| 2013/0133048 A1* | 5/2013 | Wyn-Harris | H04L 63/12 | 726/5 |
| 2013/0145177 A1* | 6/2013 | Cordella | G06F 21/78 | 713/193 |
| 2013/0177219 A1* | 7/2013 | Frojdh | H04N 7/15 | 382/118 |
| 2013/0188031 A1* | 7/2013 | Park | G06V 40/103 | 348/77 |
| 2013/0225129 A1* | 8/2013 | Norbisrath | H04L 63/105 | 455/411 |
| 2013/0263238 A1* | 10/2013 | Bidare | H04L 9/3231 | 726/7 |
| 2013/0290707 A1* | 10/2013 | Sinclair | H04L 9/3226 | 713/161 |
| 2013/0339525 A1* | 12/2013 | Tamari | G06F 21/6218 | 709/225 |
| 2014/0019686 A1* | 1/2014 | Dong | G06F 12/0864 | 711/128 |
| 2014/0020090 A1* | 1/2014 | Nada | G06V 10/993 | 726/19 |
| 2014/0033284 A1* | 1/2014 | Harik | H04L 9/40 | 726/5 |
| 2014/0096210 A1* | 4/2014 | Dabbiere | H04L 63/0861 | 726/5 |
| 2014/0115292 A1* | 4/2014 | Mclachlan | G06F 21/14 | 711/170 |
| 2014/0118519 A1* | 5/2014 | Sahin | H04N 23/64 | 348/E7.085 |
| 2014/0208394 A1* | 7/2014 | Goodwin | H04L 9/3247 | 726/4 |
| 2014/0241099 A1* | 8/2014 | Seo | G11C 8/06 | 365/230.04 |
| 2014/0331282 A1* | 11/2014 | Tkachev | H04L 63/0884 | 726/3 |
| 2014/0333415 A1* | 11/2014 | Kursun | G06Q 30/00 | 340/5.83 |
| 2015/0058016 A1* | 2/2015 | Goldstein | G06F 16/636 | 704/246 |
| 2015/0058931 A1* | 2/2015 | Miu | G06Q 20/02 | 707/784 |
| 2015/0081299 A1* | 3/2015 | Jasinschi | A61B 5/165 | 704/246 |
| 2015/0081870 A1* | 3/2015 | Hamada | H04L 12/1818 | 709/223 |
| 2015/0095999 A1* | 4/2015 | Toth | H04L 9/3263 | 726/6 |
| 2015/0100753 A1* | 4/2015 | Shen | G06F 12/1027 | 711/207 |
| 2015/0106148 A1* | 4/2015 | Thomas | G06Q 50/01 | 705/7.19 |
| 2015/0128240 A1* | 5/2015 | Richards | H04W 12/068 | 726/7 |
| 2015/0128242 A1* | 5/2015 | Hoy | H04L 63/0884 | 726/9 |
| 2015/0135292 A1* | 5/2015 | Lee | H04L 63/08 | 726/7 |
| 2015/0229514 A1* | 8/2015 | Okuyama | H04L 67/30 | 709/214 |
| 2015/0234751 A1* | 8/2015 | Van Der Sluis | G06F 12/1408 | 713/193 |
| 2015/0244718 A1* | 8/2015 | Smets | G06F 21/34 | 726/7 |
| 2015/0281204 A1* | 10/2015 | Ellis | H04L 45/64 | 726/9 |
| 2015/0363329 A1* | 12/2015 | Precourt | G06F 12/0292 | 711/207 |
| 2015/0363803 A1* | 12/2015 | Thomas | G06Q 50/01 | 705/7.33 |
| 2015/0381624 A1* | 12/2015 | Reiter | G06F 21/6245 | 713/168 |
| 2016/0012427 A1* | 1/2016 | Van Heerden | H04L 63/0853 | 705/44 |
| 2016/0048457 A1* | 2/2016 | Hars | G06F 21/755 | 711/163 |
| 2016/0055327 A1* | 2/2016 | Moran | G06F 21/32 | 726/19 |
| 2016/0080347 A1* | 3/2016 | Rappaport | G06F 21/30 | 726/5 |
| 2016/0085962 A1* | 3/2016 | Sokolov | G06F 21/31 | 726/6 |
| 2016/0140341 A1* | 5/2016 | Kramer | G06F 21/577 | 726/25 |
| 2016/0162729 A1* | 6/2016 | Hagen | G06V 40/67 | 382/118 |
| 2016/0231887 A1* | 8/2016 | Hatano | G06V 30/40 | |
| 2016/0277439 A1* | 9/2016 | Rotter | H04L 63/0861 | |
| 2016/0308859 A1* | 10/2016 | Barry | G07C 9/22 | |
| 2017/0019400 A1* | 1/2017 | Drolshagen | H04L 63/0861 | |
| 2017/0032485 A1* | 2/2017 | Vemury | G06F 16/9535 | |
| 2017/0078880 A1* | 3/2017 | Likar | H04W 8/005 | |
| 2017/0104957 A1* | 4/2017 | Farrell | H04N 7/147 | |
| 2017/0115726 A1* | 4/2017 | Fung | G06V 40/10 | |
| 2017/0134326 A1* | 5/2017 | Laporta | H04L 51/214 | |
| 2017/0135577 A1* | 5/2017 | Komogortsev | A61B 5/168 | |
| 2017/0147870 A1* | 5/2017 | Shakib | G06F 16/51 | |
| 2017/0180361 A1* | 6/2017 | Sampas | H04N 5/33 | |
| 2017/0201518 A1* | 7/2017 | Holmqvist | H04L 63/10 | |
| 2017/0264608 A1* | 9/2017 | Moore | G07C 9/257 | |
| 2018/0011802 A1* | 1/2018 | Ndu | G06F 21/602 | |
| 2018/0068334 A1* | 3/2018 | Alomar | G06Q 30/0209 | |
| 2018/0122031 A1* | 5/2018 | Chabanne | H04L 9/0643 | |
| 2018/0173871 A1* | 6/2018 | Toth | H04W 12/126 | |
| 2018/0246818 A1* | 8/2018 | Tsirkin | G06F 9/45558 | |

(56) References Cited

U.S. PATENT DOCUMENTS

| | | | |
|---|---|---|---|
| 2018/0307626 A1* | 10/2018 | Chessin | H04L 9/0891 |
| 2018/0373850 A1* | 12/2018 | Morgan | G06F 12/145 |
| 2019/0347213 A1* | 11/2019 | Lutz | G06F 21/602 |
| 2019/0361605 A1* | 11/2019 | Kanno | G06F 3/0679 |
| 2020/0007332 A1* | 1/2020 | Girkar | G06F 21/72 |
| 2020/0125770 A1* | 4/2020 | LeMay | H04L 9/32 |
| 2020/0159674 A1* | 5/2020 | Morgan | G06F 12/1408 |
| 2020/0159676 A1* | 5/2020 | Durham | H04L 9/32 |
| 2020/0201789 A1* | 6/2020 | Durham | G06F 21/602 |
| 2021/0049309 A1* | 2/2021 | Su | G06F 3/062 |
| 2021/0055864 A1* | 2/2021 | Noh | G06F 3/0679 |
| 2021/0056023 A1* | 2/2021 | Jin | G06F 11/1446 |
| 2021/0294880 A1* | 9/2021 | Polychronidis | G06V 30/413 |
| 2021/0319142 A1* | 10/2021 | Kärkkäinen | G06F 21/78 |
| 2022/0147251 A1* | 5/2022 | De Mulder | G06F 3/0655 |

\* cited by examiner

A process involving identity proofing, the process performed electronically, automated on a computer system and scalable as to number of persons participating
100

Verifying step: verifying that a potential candidate electronically seeking identity proofing is on an electronic directory of persons eligible for such identity proofing
105

Creating step: creating an attest list, the attest list comprising for each potential candidate, one or more associates of the potential candidate that can confirm the identity of the potential candidate when viewing a video of the potential candidate
110

Collecting step: collecting a video from the potential candidate making an electronic request for identity proofing
115

Presenting step: presenting the video to the one or more associates on the attest list
120

Asking step: asking the one or more associates for a confirmation or a disavowal of the identity of the potential candidate based on reviewing the video
125

Deriving step: deriving a biometric from the video upon receiving the confirmation from any of the one or more associates
130

Saving step: saving the biometric as an identify-proofed biometric
135

Fig. 1

A process involving identity proofing, the process performed electronically, automated on a computer system and scalable as to number of persons participating
100

Verifying step: verifying that a potential candidate electronically seeking identity proofing is on an electronic directory of persons eligible for such identity proofing
105

Creating step: creating an attest list, the attest list comprising for each potential candidate, one or more associates of the potential candidate that can confirm the identity of the potential candidate when viewing a video of the potential candidate
110

Collecting step: collecting a video from the potential candidate making an electronic request for identity proofing
115

Presenting step: presenting the video to the one or more associates on the attest list
120

Asking step: asking the one or more associates for a confirmation or a disavowal of the identity of the potential candidate based on reviewing the video
125

Deriving from data step: deriving a biometric from data acquired from the potential candidate
830

Fifth saving step: saving the biometric as an identify-proofed biometric
835

Fig. 8

A process involving identity proofing, the process performed electronically, automated on a computer system and scalable as to number of persons participating 100

Verifying step: verifying that a potential candidate electronically seeking identity proofing is on an electronic directory of persons eligible for such identity proofing 105

Creating step: creating an attest list, the attest list comprising for each potential candidate, one or more associates of the potential candidate that can confirm the identity of the potential candidate when viewing a video of the potential candidate 110

Collecting step: collecting a video from the potential candidate making an electronic request for identity proofing 115

Presenting step: presenting the video to the one or more associates on the attest list 120

Asking step: asking the one or more associates for a confirmation or a disavowal of the identity of the potential candidate based on reviewing the video 125

Second taking-action step: taking an action upon receiving the confirmation, said action selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate 905

Fig. 9

AUTOMATED SCALABLE IDENTITY-PROOFING AND AUTHENTICATION PROCESS

CROSS REFERENCE TO RELATED APPLICATIONS

This application is a continuation-in-part of and claims priority to U.S. application Ser. No. 16/184,965, filed Nov. 8, 2018, entitled "Automated Scalable Identity-Proofing And Authentication Process, which is a continuation of and claims priority to U.S. application Ser. No. 15/587,870, filed May 5, 2017, entitled "Automated Scalable Identity-Proofing And Authentication Process" which claims priority under 35 USC 119 to U.S. Provisional Application No. 62/338,114, filed May 18, 2016, entitled "Biometric System to Automatically Resolve Security Alerts in Computer Networks," all of which are incorporated by reference herein in their entireties.

TECHNICAL FIELD

In the field of information management, a method improving security in the use and usefulness of computer-related technology so as to increase confidence in identity proofing and to improve the efficiency and reliability of electronic authentication of individuals.

BACKGROUND ART

The modern computer network is often an amalgam of disparate computer systems, particularly for business, government and educational organizations. These computer systems are often networked together in what is a virtual nervous system, integrating a diverse array of operational activities.

There may be several points in the normal course of a computer network where identity may need to be determined. Logging in to a system is one such point. Other points include when verifying that a person did in fact send an email, acquiring electronic signatures for documents or approving a security alert. When such an event occurs, the system is invoked to verify the identity of a given target user.

The security and integrity of each individual network has become a significant area of concern. Many diverse security systems exist to protect organizations from malicious attacks on the data, computers and networking that comprise each such network. Some are more successful than others.

Companies have responded to these attacks in several ways. One of the most common is to use a second channel of proof that is independent of the computer channel.

The technique with the broadest deployment is Short Message Service One-Time Passwords (SMS OTP). In this case, a mobile phone is used as an independent channel for authentication built upon the capability to receive SMS messages. When a user forgets their password for example, an SMS message is sent to the user's mobile phone containing a temporary password that can be used only once. The user is to log in with the one-time password and then change their password. This method has been broadly deployed since it is fairly cheap to implement, as most people have their own mobile phones and so additional hardware is not necessary.

Another technique is to use a hardware token, e.g. a key fob, which generates a temporary code that can be authenticated at the server end to grant access, such as the RSA SECURID system.

Another technique in the market is the use of biometrics. Biometrics refers to mathematical representations of human aspects such as facial or voice measurements that can be used to uniquely identify an individual within a given confidence threshold. First, the user's biometrics are enrolled into a system, and subsequently when the user returns claiming an identity, the presented biometrics are compared to the stored values and a determination is made on identity.

Another approach is to use mobile phones, associating a phone's unique characteristics with a user. For example, a phone may have a unique network address, and this address can be associated with a user.

SUMMARY OF INVENTION

An automated process is disclosed for improving the functionality of computer systems and electronic commerce in user identity-proofing. Steps include verifying that a user who is electronically seeking identity proofing is on an electronic directory of persons eligible for such identity proofing; creating an attest list for the user that includes associates who can vouch for his or her identity; collecting a video or other data from the user; sending the video or data to the associates and asking them for a confirmation or a disavowal of the identity of the user; deriving a biometric from the video or data upon receiving the confirmation; and saving the biometric as an identity-proofed biometric.

Further optional steps include designating a number of associates that are needed to confirm the identity of the user; scoring a confidence level equaling the percentage of designated associates responding to confirm; creating a list of the associates who confirmed or disavowed the user; storing the location where the electronic request originated; storing the type of computer from which the electronic request originated; storing the Media Access Control (MAC) address from which the electronic request originated; and storing an IP address from which the electronic request originated.

The process may further include steps of receiving a second video from the potential candidate incident to a subsequent electronic request for authentication from the potential candidate; deriving a second biometric from the second video; setting a threshold for matching the second biometric with the identity-proofed biometric; denying authentication of the potential candidate when the second biometric does not meet the threshold, or taking an action that includes limiting access to the computer system by the potential candidate; allowing access to the computer system by the potential candidate; collecting and changing a password associated with the potential candidate, verifying the authorship of an electronic document; verifying the authorization of an email from the potential candidate, signing an electronic document by the potential candidate, and issuing a physical identification document that vouches for the identity of the potential candidate.

The process may be performed using a smartphone to collect the video and to send the video to the associate. While an associate may be listed on the attest list as being able to vouch for the potential candidate, an optional step is to strike anyone on the attest list that has not received an approval of a third party, such as a supervisor, to vouch for the potential candidate.

Technical Problem

A significant problem stems from the use of a username and password combination to authenticate a user's identity.

Security from this arrangement is based on the assumption that only the legitimate user will know the username and password combination, and so if the username and password combination is correct, then it is assumed that the user is legitimate and can be provided access.

It is now commonly recognized that this assumption is flawed because of the phenomenon of 'phishing.' Phishing refers to tricking a user to reveal their username and password combination using fake email or websites. Such ruses are now quite common, and relatively easy to do for attackers. Such ruses are also difficult for users, even sophisticated users, to quickly determine if a website is legitimate or not. This is because legitimate websites and systems require users to reset their passwords occasionally (ironically sometimes for security purposes or in response to phishing attempts), and phishers then copy these legitimate requests when creating their phishing sites.

In addition, many users end up using common and predictable passwords that can be guessed or brute-forced. And of course, people forget their passwords often and this leads to user frustration. Thus, the most commonly used method for ensuring computer system security is not very effective, and leads to many incidents of data breaches, some of which even make news because of their implications for business or for national security.

The Short Message Service One-Time Passwords (SMS OTP) method has several flaws. First, the user has to associate their mobile phone with their identity. Many users do not take this additional step as they view it as an inconvenience. Second, associating their identity consists of matching a password before linking a phone number the user provides to their identity. Of course, if an attacker has already compromised the user's password, then the attacker may associate their identity instead of the user. Third, because of the insecurity of identity at large mobile providers, attackers have taken over a user's phone account and acquire a new phone with the number associated with that account, and thus receive the one-time password on that new device. Fourth, the SMS network is itself vulnerable to spoofing attacks, and an attacker may intercept the one-time password within the network without needing access to the phone. Thus, this is a very insecure means of ensuring security, and for these reasons the National Institute of Standards and Technology (NIST) deprecated the use of SMS OTP.

The use of hardware tokens, such as in the RSA SECURID system, has flaws. First, the system is generally cumbersome to use. The user has to remember to have the token with them. The token then generates a long sequence of digits that must be entered, and many users have difficulty with this process. Second, for companies, there are additional hardware costs and maintenance costs to be paid for the extra hardware. Third, the system's security has been compromised in the past and so has been criticized as not being as secure as advertised.

Existing procedures using biometrics have several weaknesses. First, given the distributed nature and sheer number of users, it is usually infeasible to verify identity to a high degree of satisfaction before enrolling in the biometric database. The usual path is to use passwords as a proxy to determine identity before enrolling, and of course if the password is compromised, the attacker can enroll themselves as the user into the database. Second, users are not keen to perform the enrollment step as there is no immediate benefit. Third, the system has a nonzero 'false reject' rate, meaning that sometimes when it is the actually enrolled user, because biometric matching is a statistical process, the system may incorrectly not classify the user. This can lead to frustration on the part of users.

The linkage of a mobile phone with a particular user in existing methods is also vulnerable to attack. Again, the approach to initially link the user's identity with the phone is done via passwords, and so this has the same flaws outlined above, in that an attacker can substitute their phone for the real user if they know the user's password.

In general, while many technologies are available to authenticate a user once they are enrolled into a system, the process of enrollment is broken.

One approach to electronic security is to detect anomalous behavior within these networks and then raise alerts to information technology (IT) security administrators. The anomalous behavior may or may not be malicious. It then falls to the security administrators to investigate these alerts, and their role is to determine if the alert is in fact a dangerous attack that requires addressing or whether it is a false alarm.

However, in practice, most of these alerts are ignored by IT security administrators. This happens for a several reasons. First, most of these alerts are in fact harmless as many legitimate activities on a network can resemble malicious activities. Thus, administrators become fatigued with chasing down so many false alarms that they fail to investigate some of the alerts. Second, the volume of alerts often requires additional capacity from the IT department when these departments are already overloaded with their regular duties. Third, to resolve an alert, it may be prudent out of an abundance of caution to stop a user's access to the network to verify the issue. However, this interruption may not be well received by the user, and may in fact cause them to be upset when the activity is legitimate but is being misflagged. This is compounded when the user is a high level executive, and as the administrator is not certain whether the alert is legitimate or not, it can cause political difficulties within the organization. Thus, in reality, because of these reasons, these alerts are not followed up on.

There exists a need for a system that can resolve these alerts quickly and accurately with minimal intervention from IT administrators.

The process of verifying a user before they are enrolled into the system is termed "identity proofing." Identity proofing is generally seen as the domain of the staff administering the network, and has been an area that has not received much attention. These staff are usually overloaded, and since there is no automated way to proof an identity, the process is usually manual. Worse, because information technology staff in general have little or no direct knowledge of the user, the user is asked some questions to identify them, such as their employee number. Again, an attacker can steal this information and present themselves as the user, so the process is fraught with risk. In addition, because the identity proofing process requires effort from system administrators, it cannot be easily performed more often after enrollment. Most phishing attacks for example could be stopped quickly if there were a lightweight and quick way to proof identity.

Solution to Problem

The system and method disclosed is directed to a specific implementation of a solution to a problem in identity-proofing used in the electronic security arts. The security steps disclosed are notably faster and more efficient than those used in existing identity-proofing methods. This system and method can significantly improve actual security in identity-proofing using electronic means of commerce and communication.

The solution is a system and method that improves computer functionality in that the steps disclosed enable use of computers with less risk of damage due to compromise by attackers.

The steps disclosed achieve benefits over conventional security measures in that they are uniquely based on identity-proofing using an automated system that promptly obtains a reliable vouching of the user's identity by people familiar with the user's characteristics and identity.

The solution is a system and method that is based on saving identity-proofed biometrics of the user after automated and high-confidence vouching steps have taken place, so that these identity-proofed biometrics can be used with high assurance of the validity of authentication of the user.

The solution is a system and method that enables action on feedback information to be conveyed automatically back to the computer system to resolve security alerts automatically without any further intervention from the administrator.

The solution is a system and method that enables improved reliability of user authentication at sign in and when a user attempts to reset a password.

The solution is a system and method that provides full reviewability and auditability to administrators.

Advantageous Effects of Invention

The steps disclosed herein improve the functioning of electronic technology by helping to eliminate identity-proofing errors associated with access to computer systems and electronic commerce.

The method addresses known problems in obtaining reliable assurance that the user is who the user claims to be. The disclosed steps can not only automate the user-authentication processes in terms of the functioning of technology, but will avoid most issues involving user-identity fraud and administrator error in identity proofing.

The method increases functional efficiency in computer systems and electronic commerce because it discloses an automated identity-proofing process that minimizes decisions by persons who are not personally familiar with how the potential candidate looks and speaks from deciding on user authentication. Human involvement is predicated on knowledgeable verification of the user's identity by people familiar with the user's characteristics and identity.

The method provides an assurance of the validity of authentication of the user.

The method enables administrator action on feedback information to be conveyed automatically back to the computer system to resolve security alerts automatically without any further intervention from the administrator.

The method provides full reviewability and auditability to administrators.

The method disclosed herein enables use of a mobile-device application (an "app") to automate the collection of a video from the user or a photo or a fingerprint image, depending on what biometrics have been enabled and stored for that user in an identity-proofing phase.

The app would implement the steps by comparing the collected data (video and/or photo and/or fingerprint image) to the data from the identity-proofing phase. The system also compares data from the mobile device to ensure it is the same mobile device that was used either during the identity-proofing phase or afterwards. If all elements match, then this user is deemed as approved. If not, this user is deemed indeterminate and other actions are taken.

If deemed approved, then optionally additional information is collected from the user and the required approval is conveyed back to the server.

If indeterminate, an alarm is raised to the administrator. The collected video and audio is available to them on the management website, and they may then use it to determine if indeed it was an attacker or whether the system made an error. If necessary, the administrator may then pass on the collected video to one or more people in the attest list for that user for further confirmation.

BRIEF DESCRIPTION OF DRAWINGS

The drawings illustrate preferred embodiments of the process involving identity proofing according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is a block diagram showing the steps in a preferred embodiment of the method of the invention, the method involving acting on a video received from a potential candidate for identity proofing.

FIG. 8 is a block diagram showing the steps in a first alternative embodiment of the method of the invention, the first alternative embodiment involves acting on a video and also deriving a biometric on data acquired from the potential candidate.

FIG. 9 is a block diagram showing the steps in a second alternative embodiment of the method of the invention, the second alternative embodiment involves acting on a video and also specifying an action to be performed upon receiving an affirmation of identity.

DESCRIPTION OF EMBODIMENTS

Figure 2:
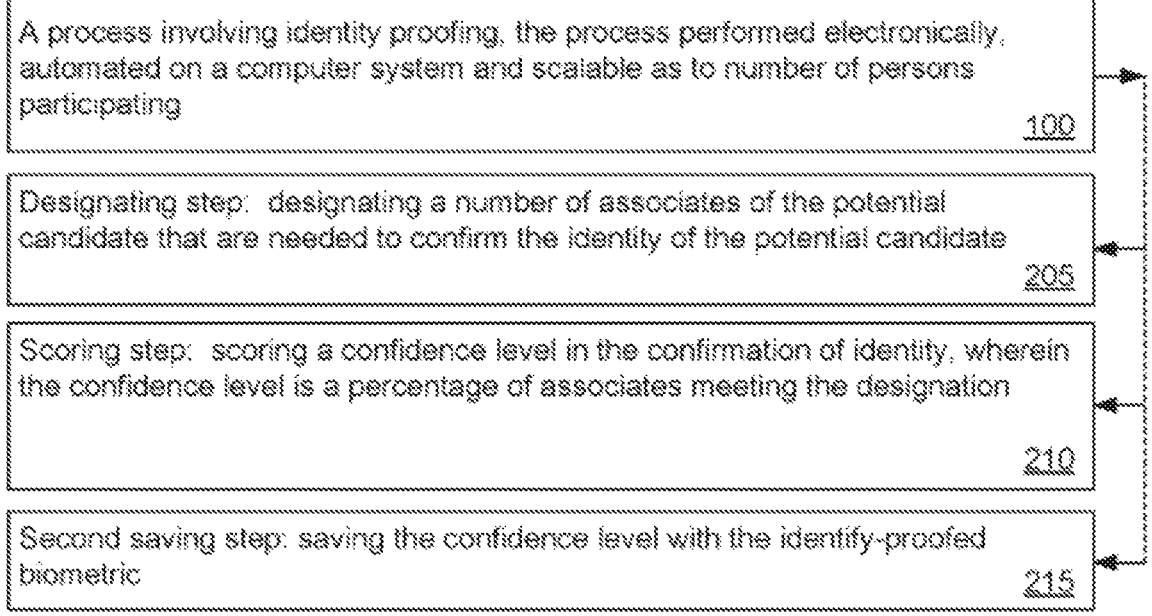
FIG. 2 is a block diagram showing optional additional steps to the steps of FIG. 1, the added steps involving a confidence level.
Figure 3:
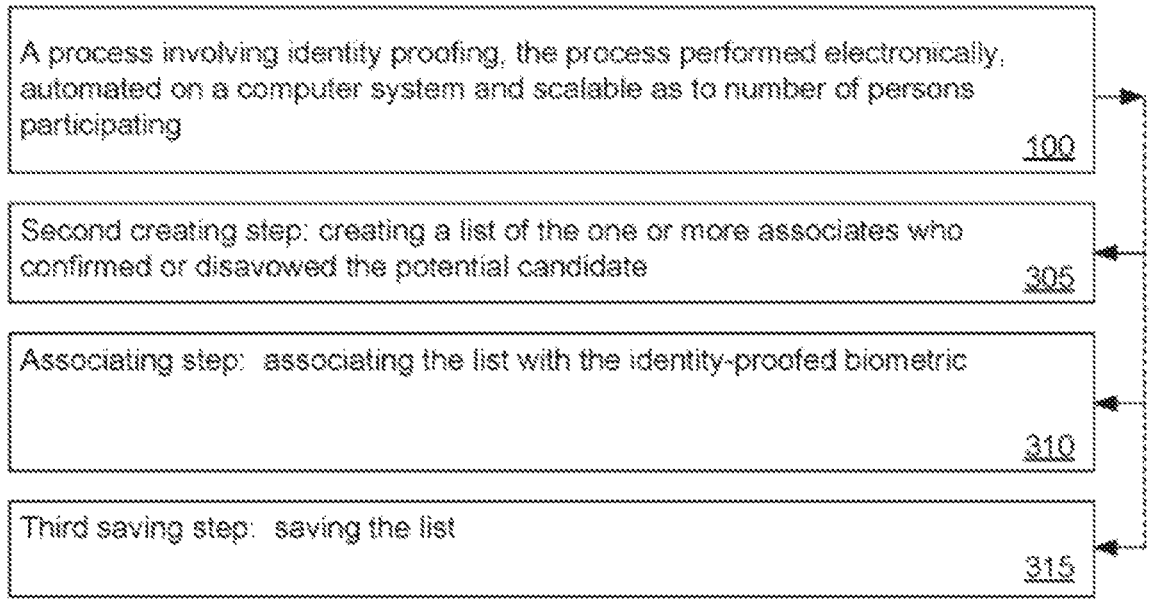
FIG. 3 is a block diagram showing optional additional steps to the steps of FIG. 1, the added steps involving a list of associates relative to affirming or disavowing an identity.
Figure 4:
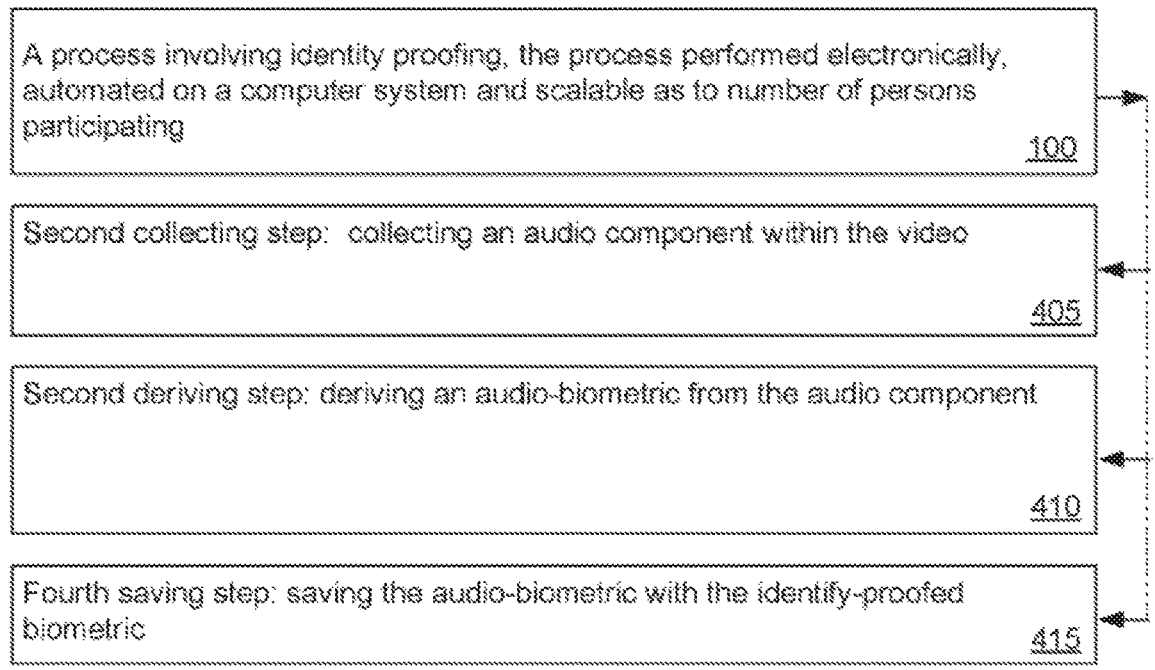
FIG. 4 is a block diagram showing optional additional steps to the steps of FIG. 1, the added steps involving an audio biometric.
Figure 5:
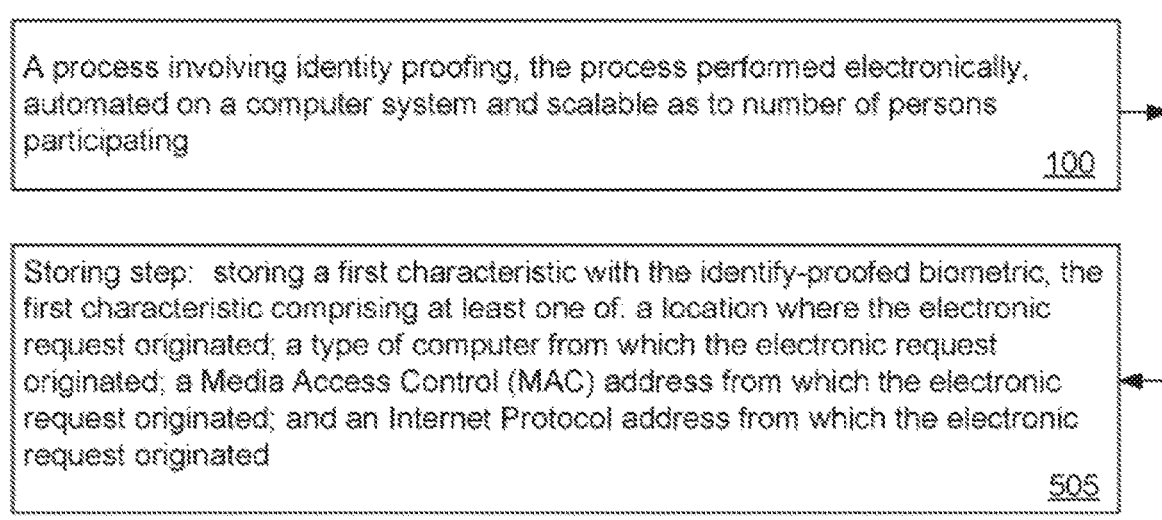
FIG. 5 is a block diagram showing optional additional steps to the steps of FIG. 1, the added steps involving storing a characteristic.

In the following description, reference is made to the accompanying drawings, which form a part hereof and which illustrate several embodiments of the present invention. The drawings and the preferred embodiments of the invention are presented with the understanding that the present invention is susceptible of embodiments using a different order of steps, or using other steps in addition to those specified. As long as the requirements of the steps are complied with, the order of the steps may be changed without departing from the scope of the invention.

FIG. 1 illustrates the preferred steps in the method of the invention, which is a process (100) involving identity proofing. The process (100) is preferably performed electronically by access to a computer database having thereon necessary lists to enable the steps in the process (100) to be automated using a computer system and or network. Communications to associates of a person seeking identity proofing are also preferably made electronically, such as by email or by using web links. Such computer use enables the process (100) to be fast, efficient and virtually unlimited as to the number of people involved in the process of identity proofing. The person seeking identity proofing is interchangeably referred to herein as a "potential candidate" or a "user."

The process (100) that may be described as first preferred method includes seven steps: These are a Verifying step (105), a Creating step (110), Collecting step (115), a Presenting step (120), an Asking step (125), a Deriving step (130), and a Saving step (135).

The Verifying step (105) is verifying that a potential candidate electronically seeking identity proofing is on an electronic directory of persons eligible for such identity proofing. The electronic directory is preferably a database of persons, such as MICROSOFT'S ACTIVE DIRECTORY, a telephone directory, or other list of persons within an organization. The database would also preferably show a person's position within an organization and may have information on colleagues and superiors within the organization. The electronic directory may be developed using a social graph in a social network or from the set of people who a potential candidate regularly communicates with using electronic means (covering both messaging and email).

The Creating step (110) is creating an attest list, the attest list comprising for each potential candidate, one or more associates of the potential candidate that can confirm the identity of the potential candidate when viewing a video of the potential candidate. The attest list is optionally a cross-reference in the electronic directory that the person so referenced is qualified to attest for a specific potential candidate in the electronic directory.

The Collecting step (115) is collecting a video from the potential candidate making an electronic request for identity proofing. The video is a digital recording of moving visual images of the potential candidate. The video preferably includes an audio component representing a digital recording of the something said by the potential candidate and made with the video. Thus, the video may or may not include an audio component.

The Presenting step (120) is presenting the video to the one or more associates on the attest list. This is optionally accomplished by an email to the person, i.e. an attesting person, who has been previously qualified to attest to the identity of the potential candidate. The email preferably has the digital video file attached to the email or provides a link for the attesting person to click on to review the video.

The Asking step (125) is asking the one or more associates for a confirmation or a disavowal of the identity of the potential candidate based on reviewing the video. This is optionally accomplished by an email to the attesting person to review the video file and send a reply that either confirms the identity of the person on the video file or indicates that the person in the video is not who he claims to be.

The Deriving step (130) is deriving a biometric from the video upon receiving the confirmation from any of the one or more associates. Preferably, the biometric is derived when enough of the associates approve. A biometric is derived by statistical analysis of measurable biological characteristics obtained from the video in this case, or any other biological data in other cases, that are unique to the individual. This step may be performed at any time in the process (100) after receiving the video from the potential candidate. For example, a temporary biometric might be created immediately upon receipt of the video and held for later action in the process (100).

There are various types of characteristics that can be derived from a video, including, as examples: retina scans produce an image of the blood vessel pattern in the light-sensitive surface lining the individual's inner eye; iris recognition is used to identify individuals based on unique patterns within the ring-shaped region surrounding the pupil of the eye; Finger scanning, the digital version of the ink-and-paper fingerprinting process, works with details in the pattern of raised areas and branches in a human finger image, finger vein identification is based on the unique vascular pattern in an individual's finger; facial recognition systems work with numeric codes called face prints, which identify 80 nodal points on a human face, and when audio is also present, voice identification systems rely on characteristics created by the shape of the speaker's mouth and throat, rather than more variable conditions.

The Saving step (135) is saving the biometric as an identity-proofed biometric. Once the potential candidate's identity has been confirmed or verified by those designated to review and confirm the potential candidate's identity, and after the biometric has been derived (which may occur at any time after receipt of the video), then the biometric is saved and designated as an identity-proofed biometric. The identity-proofed biometric may be saved to a system computer, to a smart phone, or to any other computer accessible in implementing the process. The identity-proofed biometric is then electronically available to be used for future comparisons against later videos sent seeking confirmation of the identity of that potential candidate in a future authentication request. If there were a disavowal of identity from an associate, then this preferably means that the potential candidate's identity proofing failed. In the event of such a failure, there would be no identity-proofed biometric.

Example of a Preferred Embodiment

In this example, the system includes a frontend client (a local computer, such as a smartphone or a tablet computer, also referred to as a mobile device) and a backend server (a remote computer, such as a network computer). The mobile device collects via an app on the mobile device a short video of the potential candidate wanting access to the computer network of an organization to which the potential candidate works for or otherwise belongs. The app is designed to collect audio, video and photo data from the potential candidate for verification of the potential candidate's identity. In this example, the mobile device accesses an electronic directory of people, such as MICROSOFT'S ACTIVE DIRECTORY, within that organization over an LDAP protocol to verify that the potential candidate owning the mobile phone is eligible for identity proofing. It can access the potential candidate's information within the directory by first asking the potential candidate for an identifying piece of information such as their email address or name, and then using that information to query the electronic directory.

In this example, the system then identifies one or more colleagues or associates of the potential candidate who are listed as being able to vouch for the identity of potential candidate. For this example, this consists of people with direct knowledge of the potential candidate and have been approved by someone else in the organization to be able to vouch for the potential candidate. Examples of such colleagues are supervisors, peers, subordinates, etc.

In this example, the app on the potential candidates mobile device then contacts one or more colleagues via the app on their mobile phone and presents the potential candidate's video. The app on the colleague's or colleagues' mobile phone(s) then asks for their confirmation or disavowal of the potential candidate's identity.

In this example, each colleague then either approves the potential candidate or rejects the request for identity proof. Approval occurs if there are enough positive responses and no negative responses. If there are any disavowals, the app rejects the request for identity proof and alarms are sent to the administrators of the system. The administrator can then review the video and take appropriate action.

In this example, once the potential candidate is approved as to his identity, the approved status is conveyed back to the potential candidate via the app and the acquired video is processed to derive biometrics, such as facial and voice biometrics. In addition, if the mobile device has the capability to take a fingerprint, then fingerprint biometrics are also derived and stored on the mobile device. Because these biometrics are trusted only after identity-proofing, they are termed as identity-proofed biometrics. Note that the biometrics can alternately be stored on the backend server.

In this example, the backend server is designed to receive subsequent requests to authenticate the identity of the potential candidate received from people other than the potential candidate or from computer systems. Once a request is received at the backend server, the backend server contacts the mobile device for the potential candidate and asks the potential candidate to input new audio, video, fingerprint or photo data. Once the input is processed to derive a new biometric, which is saved with the app or on the backend server, the new biometric is compared to the identity-proofed biometric. If the comparison is favorable, then, a response is conveyed, using the app on the potential candidate's mobile device or using the backend server, to the requesting party.

If a mobile device, e.g., a smart phone or the like, is used to authenticate the identity of a potential candidate, it may be desirable for the backend server to confirm the identity of the user of the mobile device. For example, it may be possible for an attacker to pretend to be a user and to send a fake confirmation at around the same time as an expected confirmation from the legitimate user. One way to establish the identity of the user is with use of a cryptographic certificate.

Using cryptographic certificates to establish identities of entities communicating electronically is well-known in the art. The backend server, in the present instance, however, may use cryptographic certificates to establish a user's identity after the successful completion of the endorsement process, e.g., in which or more colleagues have authenticated the user's identity.

Thus, the following method may be used to reliably ensure the integrity of identity with use of a mobile device.

A user, for example, may begin the endorsement process, as discussed above, using an application (app) on a frontend client, such as the user's mobile device. The app may contact the backend server, which may begin the process of initialization.

The app can be sure it is contacting the backend server and not an impostor system, e.g., by verifying the backend server's https public-key certificate using standard means. The backend server, however, needs to ensure that it is communicating with the correct frontend client. In one implementation, the backend server may respond to the contact from the frontend client by providing a unique cryptographic certificate back to the app. The cryptographic certificate, for example, is unique to the app on this frontend client, and in one implementation is the private key part of a key pair generated by the backend server. In this case, the server stores the public key part of the key pair. In another implementation, this could be a single key that is used in for symmetric encryption of the communication between the backend server and the app on the mobile device. In this case, the server stores this key.

From that point onward, all communications from the app on this particular frontend client utilizes the cryptographic certificate to sign each transmission to the backend server. The recipient of a transmission, thus, can use the public key associated with the cryptographic certificate to authenticate that the communication originated from the correct counterpart entity. If symmetric encryption is used, then the recipient can use its previously stored key to decrypt the received message.

When the endorsement process completes successfully as discussed above, the backend server may associate the unique cryptographic certificate with the related user in its database. Any actions from the mobile device are signed with the cryptographic certificate, and on receipt, the backend server decrypts the message using the techniques in the prior paragraph. On successful decryption, the backend server can be certain that it came from the device associated with the related user. If the action is preceded by a verification of the related user against identity-proofed biometrics on that device, then the backend server can be certain both that it is the related user who originated the action, and that it was performed on the associated mobile device. For example, an identity-proofed biometric, such as a fingerprint, facial recognition, retinal scan, etc., may be stored on user's mobile device. An action, such as verification of the identity-proofed biometric may be performed on the mobile device and the result, encrypted with the cryptographic certificate, provided to the backend server.

In this example, the backend server operates as a reporting interface that provides a mechanism for administrators to securely log in and review the performance of the system. In this example, the reporting interface is accessible over the web. Administrators are able to look at each authentication the backend server performed and review the audio, video or photo data as well as the system decision to authenticate or disavow the identity of the potential candidate. Administrators are also given control abilities to change the system's decision or for affecting the entire system as a whole. be notified. The system can notify the administrator for investigation, presenting both the candidate's data as well as the data from the original enrollment for their evaluation on whether the candidate is an impostor.

Thus, Administrators of Organizations may be permitted to perform various actions for enrolled Users. For example, an Administrator may be allowed to compare a previously endorsed video to a candidate video in order to make a decision about a User's identity. In one example, scenario a user who has been previously endorsed, i.e., the identity verified as described herein, may be moving to a new device (e.g., new client such as smart phone or computer, perhaps, for example, after losing the prior device.) The system will require the User to be endorsed by their peers before the new device can be trusted. This process normally can take time. The User may want to be endorsed faster than this normal process, for example, in order to log in prior to an urgent business meeting.

In this case, someone with Administrator privileges may use an Administrator Portal to expedite the process. The Administrator Portal, for example, may present to the Administrator the prior-endorsed video from the old device and also provide a current candidate video from the new device. The Administrator may compare these two videos and determine if this is indeed the same person. If it is, the Administrator may click an Endorse button and endorse the User immediately, which allows them to log in right after. This ensures a higher level of security with a positive affirmation of identity than systems now that depend on user-presented tokens such as passwords. Thus, in a process for confirming an identity of a user, a new set of video data may be acquired from a mobile device associated with the user. The new set of video data may be used for verifying an identity of the user, wherein the identity of the user was previously confirmed based on an initial set of video data. The initial set of video data with which the identity user was previously confirmed may also be acquired. The initial set of video data and the new set of video data may be provided for comparison, e.g., to an Administrator or other person via a portal. Whether the identity of the user is confirmed may be based on the comparison of the initial set of video data and the new set of video data. For example, the two sets of video data may be presented to the Administrator and an indication is collected from the Administrator, via a button or other input on the Administrator portal, based on the comparison of the two sets of video data for the Administrator portal to determine whether the sets of video data match, i.e., to determine whether the identity of the user is confirmed. That indication may be stored with the User's data and may be used to identity-proof biometrics on the new device.

In this example, the backend server is deployed on a cloud platform such as Amazon AWS. For other examples, it may reside in multiple different computer systems, but may reside on one system or some combination thereof. The appropriate configuration depends on the application and security scenario the system is tasked with.

For example, the attest list may consists of a list of other persons who can vouch for a particular person's identification actually corresponds to that person's biometrics in the real world. For each person in this list, the attest list also stores whether they have actually done so.

The attest list may be generated based on the organization's structure and policies. For example, in an enterprise, for a given level of trustee, the attest list may include a person's supervisors and/or co-workers. The organization's policy may dictate who is on the attest list. In addition, the attest list may be used to derive the level of trust to attach to an entry. For example, an organization might designate that if a supervisor with a high level of trust endorses or vouches for a subordinate, then subordinate's entry may have a maximum level of trust. Another might specify that supervisors and co-workers can be on the attest list, and if at least one person on the attest list with a high level of trust has endorsed, e.g., vouched for, a person, then the person may have the maximum trust level. Still another might specify that multiple users in the attest list may need to verify the user before a high trust level is assigned.

The attest list may be generated from a graph of the relationship between the people within an organization. It is of course possible to derive the attest list from any social graph that a person belongs to, such as Facebook's social graph. Another social graph is the people who live near a person in a neighborhood.

There may be various levels of trustee, which may resemble a tree, with the root being the Root Trustee (RT). This trustee may be the company providing the system to the commercial market, though it may be for example an external entity that all participants trust. The root trustee issues trust values (through the Attest List) to Branch Trustees (BT), who can then in turn issue trust values to Leaf Trustees (LT). The BT may correspond to the administrator(s) at a particular organization (e.g. company, business unit, university, government division) and the LT corresponds to an individual user within these organizations.

To begin the process of generating trust values, the RT may be trusted by all participants. When an organization signs up, that organization nominates one or more administrators from within its ranks to be BTs for that organization. The role of a BT is to build and maintain the list of LTs within that organization.

Even though singular may be used, in reality multiple people may be designated for any trustee type. For example, multiple people may be an RT, or within an organization there may be multiple BTs. This is important to have redundancy if one of those trustees is removed from the system. One possible implementation of the system may group associated trustees into a group, and the group is then designated as the trustee for being added to the attest list. For example, all the BTs in an organization can be grouped into one single BT and this grouped trustee then designated as the BT in the AIs for that organization.

The system relies on endorsements from associates of a user to verify the identity of a user. The endorsers, e.g., members of the attest list that may verify the identity of a user, may be found via an organizational chart of the organization. In some cases, the use of an organization chart may not work. For example, if there are external vendors that need to be endorsed, those vendors may not have a designated supervisor within the company. Without a supervisor to link into the organizational chart, a set of people who know the candidate may be difficult to derive. As another example, if an organization wants to allow access to external customers, then those customers are unlikely to have supervisors within the organization.

Organizational directory systems, sometimes referred to herein as electronic directories, have the concept of groups, and a User may belong to one or more groups. For example, a User may belong to the 'Customers' group. To designate endorsers, it is possible to specify that members of another group—say 'Customer Support'—may endorse the 'Customers' group. It is advantageous to designate entire groups instead of individual members, as the latter can become tedious, especially when personnel change, or when they are unavailable. The Administrator may optionally use an Administrator Portal to perform such designation.

As a further optimization, the Administrator may create a special group within the Organizational Directory to add the User to, indicating which other groups may endorse that user. For example, the User may be added to the group 'Endorsable-By-Sales', indicating that members of the group 'Sales' can endorse this User. This is useful since the designation may be done within the organization directory itself, without using the Administrator portal. The Agent that connects to the directory in order to acquire User data for formulating the relationship graph may simply use these group names to derive these endorsement relationships automatically.

If desired, the above mechanism may be flipped such that the endorser's group can have a special string, e.g., with the group name being embedded with that string, indicating which group they may endorse. For example, members of group 'Can-Endorse-Customers' may endorse the group 'Customers'.

There is no special need to use the group attribute of the organizational directory. Any other attribute stored in an Organizational Directory that contains the relationships between the members of an Organization may be used to capture such endorsement relationships between sets of Users that cannot be derived by using the organizational chart alone.

Thus, in a process for confirming an identity of a user, data from a mobile device associated with the user may be acquired. The data, for example, may be used for verifying an identity of the user. The user is included in a first group in a directory. An attest list of the user is created. The attest list may comprise in a second group persons in the directory that have been approved to confirm the identity of a user in the first group in the directory. The first group and the second group are different groups in the directory. A video of the user is presented to the one or more associates of the user in the second group for confirmation of the identity of the user. Confirmation of the identity of the user may be obtained from the one or more associates in the second group based on reviewing the video of the user. An identifying indicator for the user may be generated based on confirmation of the identity of the user from the one or more associates. The identifying indicator for the user may be stored with the attest list comprising the one or more associates in the second group that confirmed the identity of the user.

Optional Steps and Alternatives

The Designating step (205) is an optional step indicated by the dashed line in FIG. 2 that links the boxes to the process (100) box. The same practice using dashed lines is followed in later figures. The Designating step (205) is designating a number of associates of the potential candidate that are needed to confirm the identity of the potential candidate. For example, if a person superior to the potential candidate in an organizational ranking viewed the need to obtain a higher level of assurance that potential candidate is in fact who he claims to be, then that person can designate that this potential candidate be vouched for by more than one associate on the attest list. This step provides an optional level of added security for those with access to organizational secrets or are important to the success of the organization.

The Scoring step (210) is an optional step that involves scoring a confidence level in the confirmation of identity, wherein the confidence level is the percentage of associates meeting the designation. For example, if 4 out of 5 associates confirmed the identity, but one was missing, then a confidence level of 80% could be scored. Preferably, the confidence level is an internal metric that is used for management of the identity proofing process.

The Second saving step (215) follows the Scoring step (210) and is saving the confidence level with the identity-proofed biometric. Identity proofing as carried out in the steps with the 100 series reference numbers is what may be considered an initialization phase or a phase 1. Subsequent to the initiation phase, the potential candidate is asking for confirmation that they match the proofed identity. This process is generally termed authentication and may be considered phase 2. So, in this sense, the potential candidate in the initialization phase is a potential candidate for receiving an identity-proofed biometric. Later, after an identity-proofed biometric has been saved, when the potential candidate seeks confirmation of his or her identity, authentication of that identity occurs based on a comparison of a biometric derived from a second video with the identity-proofed biometric.

The Second creating step (305) is an optional step that involves creating a list of the one or more associates who confirmed or disavowed the potential candidate. This is both a record keeping of vouches and disavowals of identity and can be used to assess the reliability of the system should that be warranted by later events.

The Associating step (310) follows the Second creating step (305) and is associating the list with the identity-proofed biometric. Associating the list with the identity-proofed biometric maintains a link to the potential candidate's record. For example, for the list to be most useful, when needed to assess the reliability of the process (100) for the potential candidate, it should be readily available to a reviewer of the actions taken on the potential candidate in the process of identity proofing.

The Third saving step (315) is saving the list. Preferably, the list is saved so as to be readily accessible and so it is preferably saved with the identity-proofed biometric.

The Second collecting step (405) is an optional step that involves collecting an audio component within the video. Preferably, but not necessarily, the video includes an audio component comprised of the potential candidate's voice. The potential candidate may be asked to speak so that an audio file can be collected. Examples of such speech include: their name, their title, their organization's name or a passphrase. The audio file may be then heard by the person vouching for the identity of the potential candidate.

The Second deriving step (410) follows the Second collecting step (405) and is deriving an audio-biometric from the audio component. The audio once converted to a biometric, termed an audio-biometric simply to linguistically distinguish it from the biometrics derived from the video, can be saved and later used to compare with a new voice component in a subsequent authentication request of the identity of the potential candidate. The comparison would typically comprise looking for comparable words, sounds and pitch patterns, matching pitch, formants, comparing the way the words flow together, and noting the pauses between words. Preferably, both aural and spectrographic analyses would be employed. Typically, the audio component would be collected with the video on the potential candidate's smart phone.

The Fourth saving step (415) is saving the audio-biometric with the identity-proofed biometric. Preferably, the biometric from the video and the audio-biometric would be saved together so as to constitute an identity-proofed biometric.

The Storing step (505) is an optional step involving storing a first characteristic with the identity-proofed biometric, the first characteristic comprising at least one of: a location where the electronic request originated; a type of computer from which the electronic request originated; a Media Access Control (MAC) address from which the electronic request originated; and an Internet Protocol address from which the electronic request originated. Matching any one of these characteristics with those obtained in a subsequent authentication request by the potential candidate is a means to add to the confidence in identity verification.

The Receiving step (605) is an optional step involving authentication after the identity-proofed biometric has been saved. As discussed above, the Receiving step (605) may be considered a first step in phase 2, involving authentication.

The Receiving step (605) is receiving a second video from the potential candidate incident to a subsequent electronic request for authentication from the potential candidate. The second video may or may not include an audio component.

The Third deriving step (610) follows the Receiving step (605) and is deriving a second biometric from the second video.

The Setting step (615) is setting a threshold for matching the second biometric with the identity-proofed biometric. The comparison with the identity-proofed biometric may not be a 100% match as there are factors that may affect the biometric, such as a change in facial appearance or voice print due to illness. The threshold is a tool to gauge the confidence level in the subsequent electronic request for authentication.

The Denying step (620) is denying authentication of the potential candidate if the second biometric does not meet the threshold. The Denying step (620) is intended to emphasize the adverse consequence of not meeting the threshold leading to a denial of the authentication request. It is also noted that lower than threshold levels may also result in a further request for information from the potential candidate.

The Taking-action step (625) is taking an action when matching the second biometric with the identity-proofed biometric meets or exceeds the threshold. The Taking-action step (625) is an optional step in the sense that it is not a thorough listing of the possible actions to be taken, but rather lists the most common steps to be taken once the threshold is met or exceeded.

Among the actions listed to be taken in the Taking-action step (625) is one selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate. As an example of an operating scenario, a security alert is generated by an external system and is conveyed by way of an Application Programming Interface (API) to the back-end. The alert contains a reference to the user relevant to the alert. For example, the alert may be related to a login attempt for that user from a new location. As another example, the alert may be related to excess computer network activity from a user's computer. As still another example, an email may have been received allegedly from the user asking for a transfer of money to an external account. An alert in this case can be triggered by the recipient of the email asking the alleged user to verify that they indeed sent the email.

The Using step (705) is an optional step that includes using a smartphone to perform the step of collecting a video of the potential candidate. A smartphone is a preferred option because of its versatility to easily and conveniently convey audio, video, fingerprint, location, and other characteristics.

The Striking step (710) is an optional step that includes striking from the attest list any associate that has not received an approval of a third party to vouch for the potential candidate. As an example, the Striking step (710) enables a supervisor to revoke the right of any associate of the potential candidate to confirm the identity of the potential candidate.

The Second using step (715) is an optional step that includes using a smartphone to perform the step of presenting the video to one or more associates. The Second using step (715) makes notice of the potential to expand the means for contacting the associate on the attest list even if the associate is not "in the office," for example, at a computer terminal on his desk. This improves the timeliness of the vouching steps in the process (100). During the course of operation of the system, it may become necessary to remove an entry in a chain of trust that links entries for multiple people. Each entry includes an identifying indicator for that person, a biometric for that person, and an attest list including third parties that can vouch for the potential candidate. This process of removal is termed 'revocation'. Revoking may become necessary when an employee leaves an organization for example—this is a benign revocation. A more serious case is when the data within the chain of trust is compromised with an impostor's data—this is a malign revocation. The revocation process is as follows: The entry within the chain of trust of the person who is being revoked is located using the identifying indicator. If the revocation is benign, all other entries where this person is on the attest list are located and the attest list of these entries is updated by removing this person from the attest list. If the revocation is malign, all other entries where this person is on the attest list are located, and a list is formulated of all entries where the person being revoked has vouched for someone. All those entries are marked untrusted. Next, looking at this set of newly untrusted persons, any persons they vouched for is marked untrusted, and anyone these people vouched for is marked untrusted, and so on, and this process is repeated down the chain of trust. Optionally, alerts may be generated for these entries to re-verify. The attest list of all entries that contain this person being revoked are updated by removing this person. Finally, this entry is deleted from the chain of trust.

The Deriving from data step (830) is in a second preferred embodiment of the process (100) that comprises some of the same steps including the Verifying step (105), the Creating step (110), the Collecting step (115), the Presenting step (120), and the Asking step (125), as described above for the first preferred method.

The Deriving from data step (830) is a new step that includes deriving a biometric from data acquired from the potential candidate. The term "data" is broader than a video and is intended to capture characteristics of the potential candidate that may be used instead of the video for deriving the biometric. In the Deriving from data step (830), the biometric is derived instead from the data and not from the video.

The Deriving from data step (830) may be performed at any time after receipt of the data, but would typically be performed upon receiving the confirmation from each of the one or more associates. The data preferably include transmissions other than a video, such as for example, a fingerprint, an eye scan, or other biological characteristic of the potential candidate. This optional step is used in addition to the Verifying step (105), the Creating step (110), the Collecting step (115), the Presenting step (120), and the Asking step (125) involving an associate reviewing a video from the potential candidate and sending authenticating or disavowing the claimed identity of the potential candidate.

The Fifth saving step (835) follows the Deriving from data step (830) and includes saving the biometric derived from the data as an identity-proofed biometric. This step specifies that the identity-proofed biometric is derived from the data obtained from the potential candidate.

The Second taking-action step (905) is in a third preferred embodiment of the process (100) that comprises some of the same steps including the Verifying step (105), the Creating step (110), the Collecting step (115), the Presenting step (120), and the Asking step (125), as described above for the first preferred method.

The Second taking-action step (905) is a new step when implementing the steps in the third preferred embodiment of the process (100). The Second taking-action step (905) includes taking an action upon receiving the confirmation, said action selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate.

In another implementation, a verification process may be used to verify the identity of a alleged sender of electronic mail (email). For example, a biometric verification to emails may be used so that an email recipient may verify that the sender of an email is indeed the person that the email purports to have been sent from.

Businesses lose millions of dollars because of Business Email Compromise every year. In many cases, attackers use phishing or other fraudulent practices to gain a user's password, and then gain access to the user's email account. Once an attacker has access is a user's email account, the attackers may forge outgoing emails that advance their attack. The fundamental problem with preventing such attacks is that there is currently no way available to determine if an email was actually sent by the alleged originator of the email and not an attacker in control of the victim's email account.

Figure 10:
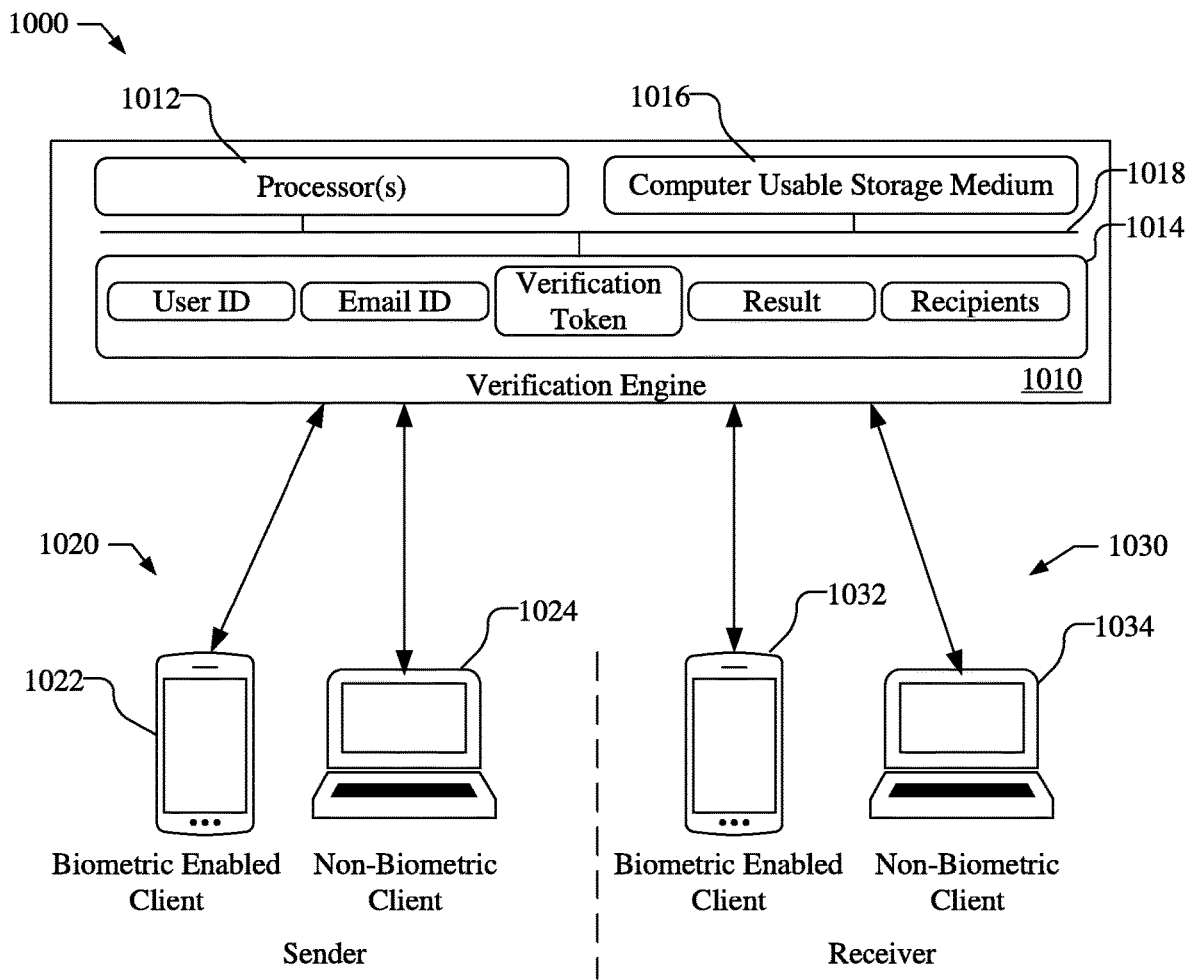
FIG. 10 is a block diagram illustrating components of a verification system.

FIG. 10 illustrates a system architecture for a system 1000 that may be used for email verification. As illustrated, the system 1000 may include a verification engine 1010, sender clients 1020, and receiver clients 1030.

The verification engine 1010, for example, may be a server that mediates between the various components of the system 1000. The verification engine 1010, for example, receives input from, and sends data and instructions to, the other components, e.g., the sender clients 1020 and the receiver clients 1030. For example, the verification engine 1010 may receive a request to verify an email from the sender client 1020 or from the receiver client 1030.

The verification engine 1010 includes at least one processor 1012 with memory 1014 and non-transitory computer usable storage medium 1016, and may include, e.g., a user interface including a display and input devices, not shown, coupled together with a bus 1018. The non-transitory computer-usable storage medium 1016 may include computer-readable program code embodied may be used by the processor 1012 and cause the one or more processors 1012 to operate as a special purpose computer programmed to perform the techniques and functions disclosed herein. The data structures and software code for automatically implementing one or more acts described in this detailed description can be implemented by one of ordinary skill in the art in light of the present disclosure and stored, e.g., on a computer-usable storage medium 1016, which may be any device or medium that can store code and/or data for use by a computer system such as the processor 1012. The computer-usable storage medium 1016 may be, but is not limited to, flash drive, magnetic and optical storage devices such as disk drives, magnetic tape, compact discs, and DVDs (digital versatile discs or digital video discs). Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. The results from the analysis of the data may be stored, e.g., in memory 1014.

For each email verified by the system, the verification engine 1010 stores in memory 1012 fields including a User ID, Email ID, Verification Token, Result, and Recipients. The User ID field, for example, uniquely identifies a User within the system, which may be a sender or receiver of an email. Examples of User ID are email addresses, mobile phone numbers, names, social security numbers, etc. The User ID serves to distinguish one User from all others within the system. The User ID may be associated with relevant information, such as biometrics and biometric-enabled clients and non-biometric clients used by the User.

The Email ID field uniquely identifies an email that is to be verified within the system, which may be received from the sender or the receiver of the email. In one example, the Email ID may be a tuple consisting of the email address of the sender, the email address of the one or more recipients, and the date timestamp in the email. In another example, the Email ID may be a hash of one or more components of the email, including the sender's email address, the email addresses of the one or more recipients, the date and time of sending, the subject of the email, the body of the email and any attachments. In another example, the Email ID may be a uniquely generated identifier, generated by the verification engine 1010 or any component of the system, or an external system, that is associated with an email.

The Verification Token field is a unique identifier that associates a User ID and an Email ID. The Verification Token specifies one email handled by the system relative to a specified User, e.g., sender or receiver. By specifying a Verification Token, it is possible to distinguish a particular email sent by a particular sender from other emails sent by the sender, and from other emails sent by other Users. The Verification Token, thus, refers to where information about a verification is stored on the verification engine 1010.

The Result field indicates the result of confirmation, such as a biometric confirmation, by the sender, as specified by the User ID, that the sender in fact sent the email specified by the Email ID.

The Recipients field stores email addresses that are in the To field of an email, or the CC field or the BCC field. In addition, if a Recipient has requested a verification of an email, then that information may be associated and stored with that Recipient. If a Recipient has indicated that the recipient wished to be notified of the status of the Verification request, then that information may also be associated and stored with that Recipient.

Users interact with the system 1000 via clients, e.g., the sender clients 1020 and the receiver clients 1030, which may be mobile phones, e.g., smart phones, or computers, e.g., personal computers, desktop computers, tablets, laptops, etc. A client may have built-in capability to use biometric verification, such as the iPhone 11, or a laptop with biometric capabilities. Such a client, illustrated by sender client 1022 and receiver client 1032, may be referred to herein as a 'biometric-enabled client' (BEC). A Client, illustrated by sender client 1024 and receiver client 1034, without this capability may be referred to as a 'non-biometric client' (NBEC).

A Client may perform one or more of the following roles: receive email, send email, and biometrically verify the User, if it is a biometric-enabled client. A biometric-enabled client may verify a User biometrically for an email originated by the user originates or it may perform verification on behalf of another Client that originated the email.

One challenge is to ensure the identity of a user, i.e., the system 1000 may verify the identity of the user before the biometrics enrolled in the biometric-enabled client may be trusted as belonging to the legitimate user. For example, if an attacker is able to substitute their biometrics for verification, then the attacker can compromise the system. Verifying the identity of the user before trusting the biometric-enabled client associated with the user ensures the integrity of the system 1000, as only valid users are enrolled in the system 1000, and not attackers. Thus, for the integrity of the system 1000, a User's biometric-enabled client may be used for verification only after others who can vouch for the User have verified the User's identity. Verification of the User's identity for example, may be performed as discussed above.

The verification engine 1010 may, on verification of a User's identity as per the above processes where associates in the organization vouch for their identity, send one or more cryptographic certificates to the biometric-enabled client that will allow the biometric-enabled client to sign and/or encrypt and decrypt emails on behalf of the User for greater security.

As illustrated with arrows in FIG. 10, the various components of the system 1000, e.g., the verification engine 1010, sender client 1020 and receiver client 1030 may communicate via the internet and may use external services to send and receive emails, using standard protocols such as the Simple Mail Transfer Protocol (SMTP) or any similar protocol, not shown in FIG. 10.

Verification of the originator of an email may be initiated by the Sender of the email prior to sending the email (termed Outbound Verification), or performed by the Receiver of the email after receiving the email (termed Inbound Verification). For Outbound Verification, the Sender of an email may use either a biometric-enabled client 1022 or a non-biometric client 1024, and the system 1000 may provide the flexibility to allow for the use of either.

Figure 11:
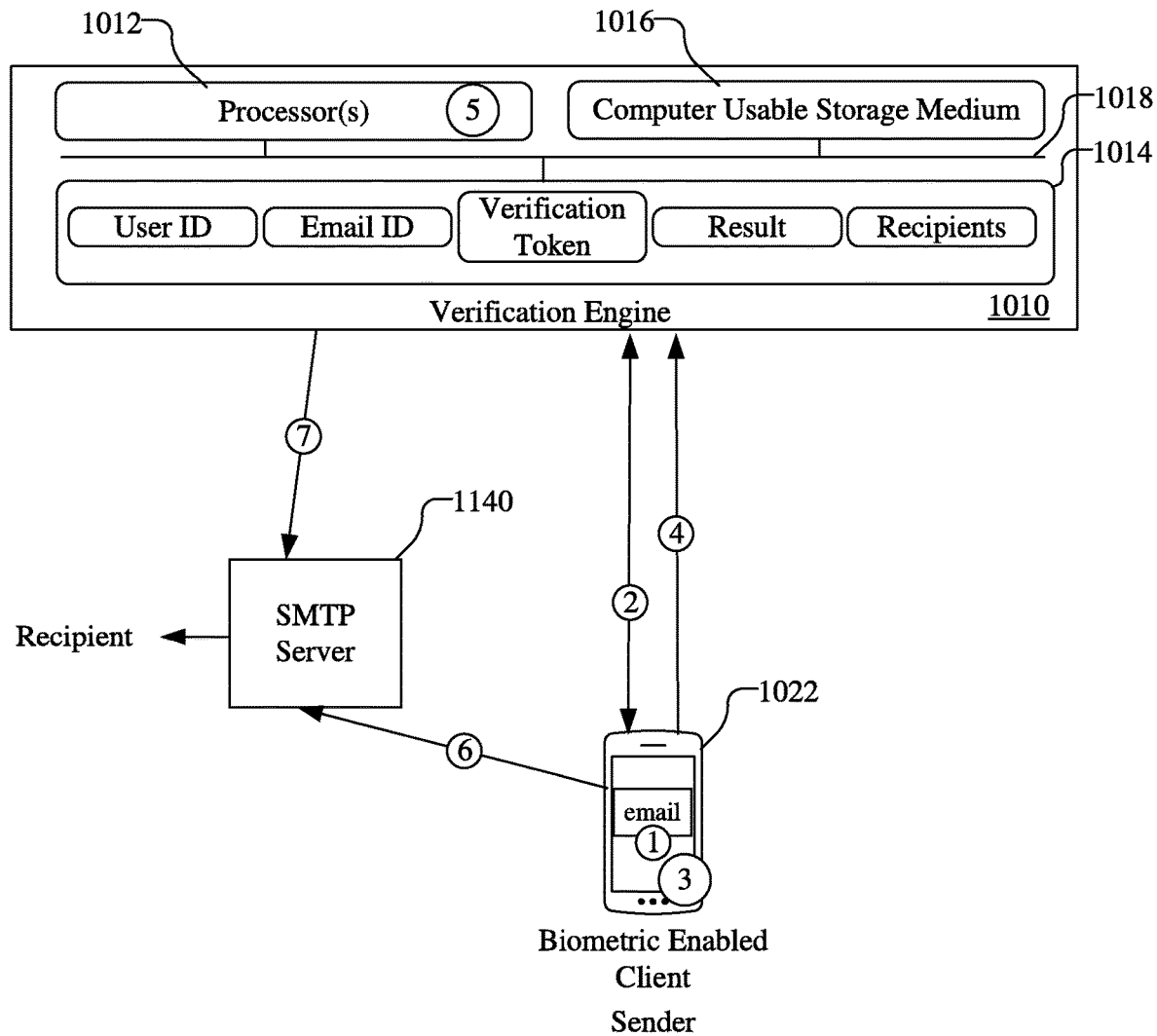
FIG. 11 illustrates operation of the verification system for Outbound Verification of an email by the Sender.

FIG. 11 illustrates operation of the system 1000 for Outbound Verification of an email by the Sender when the email is sent from the biometric-enabled client 1022.

The biometric-enabled client 1022 (1) acquires the email to be sent from the Sender, e.g., by the Sender preparing the email on the biometric-enabled client 1022 or the Sender forwarding the email from another platform. The biometric-enabled client 1022 requests (2) the verification engine 1010 for a Verification Token, which the verification engine 1010 provides to the biometric-enabled client 1022. The biometric-enabled client 1022 obtains (3) biometrics from the Sender, which may be verified by the biometric-enabled client 1022 or the verification engine 1010 using prior-enrolled identity proofed biometrics. These biometrics may be stored on the biometric-enabled client 1022 itself or on the verification engine 1010. For example, the biometric-enabled client 1022 may send biometrics, e.g., the biometric measurements (if verification is performed on the verification engine 1010) and/or an indication of verification of the biometrics (if verification is performed on the biometric-enabled client 1022) (e.g., optionally, encrypted with a cryptographic certificate, as discussed above) to the verification engine 1010 at stage 2, e.g., with the request for a Verification Token. If the verification is performed on the verification engine 1010, the verification engine 1010 may compare the received biometrics to stored prior-enrolled biometrics. In another implementation, the biometrics may be sent to the verification engine 1010 in messaging that is separate from the messaging between the verification engine 1010 and biometric-enabled client 1022 at stage 2. Once the biometrics of the Sender have been obtained and/or verified by the biometric-enabled client 1022, the biometric-enabled client 1022 returns (4) the Verification Token to the verification engine 1010 with verification of the biometrics (e.g., optionally encrypted with a cryptographic certificate as discussed above) or with the biometrics themselves, which are verified (5) by the verification engine 1010. The verification engine 1010 then composes the data associated with relevant fields and stores the result of the verification in memory 1014.

The biometric-enabled client 1022 may then send (6) the email with information related to the Verification Token, or the Verification Token itself, embedded within the email. For example, as illustrated, the biometric-enabled client 1022 may send the email via an SMTP server 1140, to the recipient. The biometric-enabled client 1022 may optionally encrypt the email using standard encryption techniques. For example, upon receipt of the Verification Token, the biometric-enabled client 1022 may optionally sign the email using cryptographic techniques, using standards such as S/MIME. The biometric-enabled client 1022 may store cryptographic certificates assigned to the Sender and uses one or more such certificates for signing and/or encrypting once the Sender is biometrically verified against the identity-proofed biometric. The biometric-enabled client 1022 optionally stores cryptographic certificates associated with the one or more Receivers and can encrypt the email with a certificate associated with a specific Receiver, thus ensuring the email can only be read by that Receiver, when their client, which may be a biometric-enabled client 1022 or non-biometric client 1024, decrypts the received email with the associated decryption key.

In one embodiment, the biometric-enabled client 1022 may send the email along with biometrics or the result of the biometric verification at stage (4) to the verification engine 1010. The verification engine 1010 can then generate (5) the Verification Token and transmit the email (7) onward to the recipient via the SMTP server 1140, with information related to the Verification Token, or the Verification Token itself, embedded in the email. Thus, in this embodiment, the biometric-enabled client 1022 does not communicate with the SMTP server 1140 itself and, accordingly, the biometric-enabled client 1022 does not need to acquire the Verification Token, i.e., stages 2 and 6 may be skipped.

Figure 12:
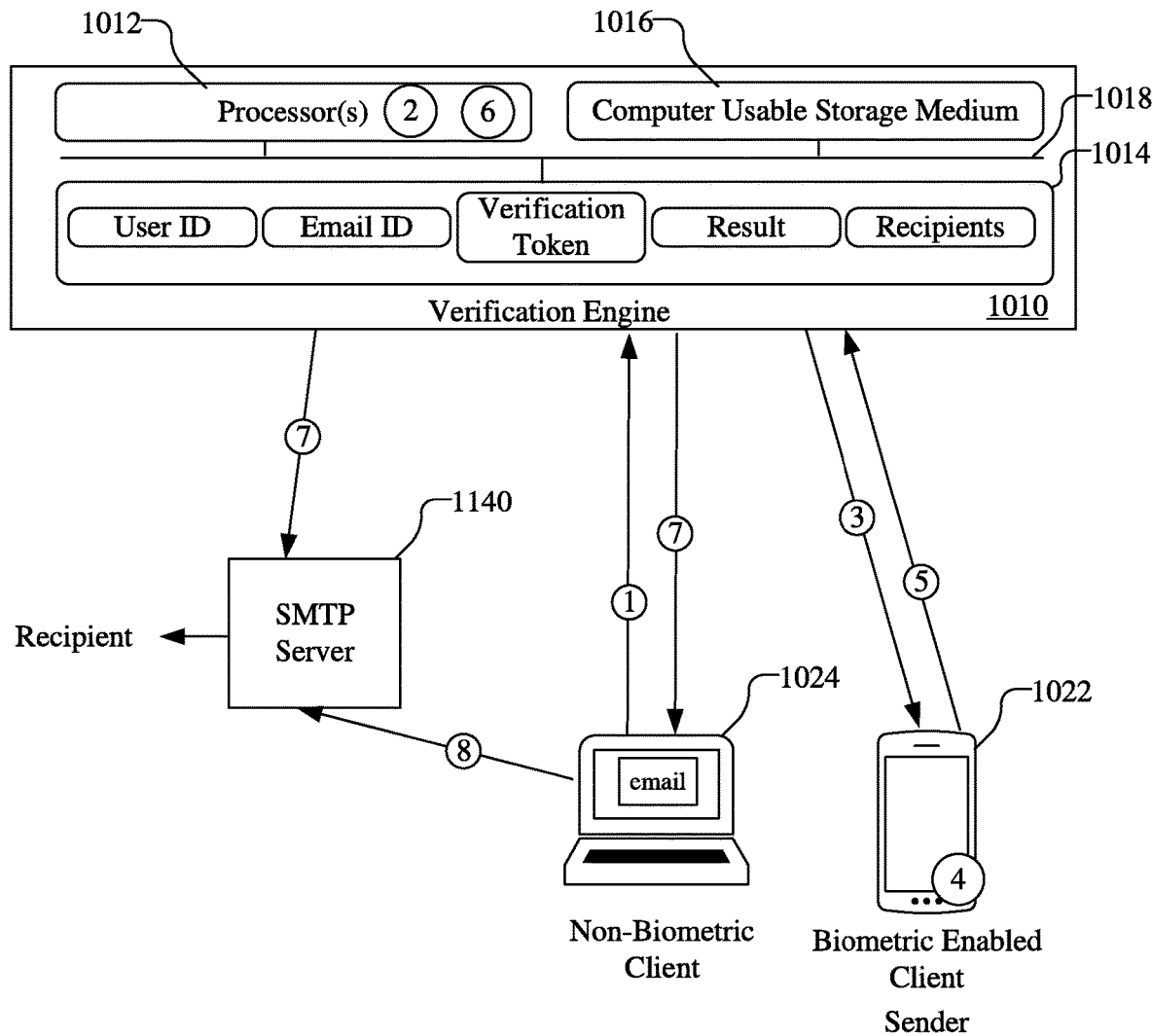
FIG. 12 illustrates another operation of the verification system for Outbound Verification of an email by the Sender.

FIG. 12 illustrates operation of the system 1000 for Outbound Verification of an email by the Sender when the email is sent from the non-biometric client 1024. The use of a non-biometric client 1024 for verification of a sent email is similar to the use of a biometric-enabled client 1022, as discussed above in FIG. 11, with the difference that the non-biometric client 1024 contacts the verification engine 1010, which then contacts an associated biometric-enabled client 1022 for biometric verification of the Sender.

As illustrated in FIG. 12, the non-biometric client 1024 sends (1) a request to verify an email, e.g., by sending the email to be verified to the verification engine 1010. The verification engine 1010 analyzes (2) the request to acquire the Sender's User ID, e.g., by acquiring the email address from the email, and looks up whether any biometric-enabled clients are associated with the User ID for the Sender. If a biometric-enabled client is found associated with the User ID for the Sender, the verification engine 1010 then sends (3) a request for biometric verification, which may include the email, to the associated biometric-enabled client 1022.

The biometric-enabled client 1022 presents the email to the Sender for confirmation (4), e.g., asking the Sender for confirmation that the Sender is the originator of the email. The biometric-enabled client 1022 collects the Sender's input of the confirmation. In addition, the biometric-enabled client 1022 biometrically verifies the Sender against prior-enrolled identity-proofed biometrics. The biometric-enabled client 1022 sends (5) the result of the biometric verification, e.g., the verification of the biometrics (e.g., optionally encrypted with a cryptographic certificate as discussed above) or with the biometrics themselves, and the confirmation to the verification engine 1010. In some implementations, the biometric verification may serve as confirmation from the biometric-enabled client 1022.

The verification engine 1010 may generate (6) a Verification Token, which may be provided (7) to the non-biometric client 1024 to specify that the email is verified as being sent by the Sender. The non-biometric client 1024 may send (8) the email with information related to the Verification Token, or the Verification Token itself, embedded within the email, e.g., via the SMTP server 1140, to the recipient. The non-biometric client 1024 may optionally encrypt the email using standard encryption techniques. Alternatively, the verification engine 1010 may transmit (9) the email onward to the recipient via the SMTP server 1140, with information related to the Verification Token, or the Verification Token itself, embedded in the email, and thus stages 7 and 8 may be skipped. The verification engine 1010 then composes the data associated with relevant fields and stores the result of the verification in memory 1014.

Figure 13:
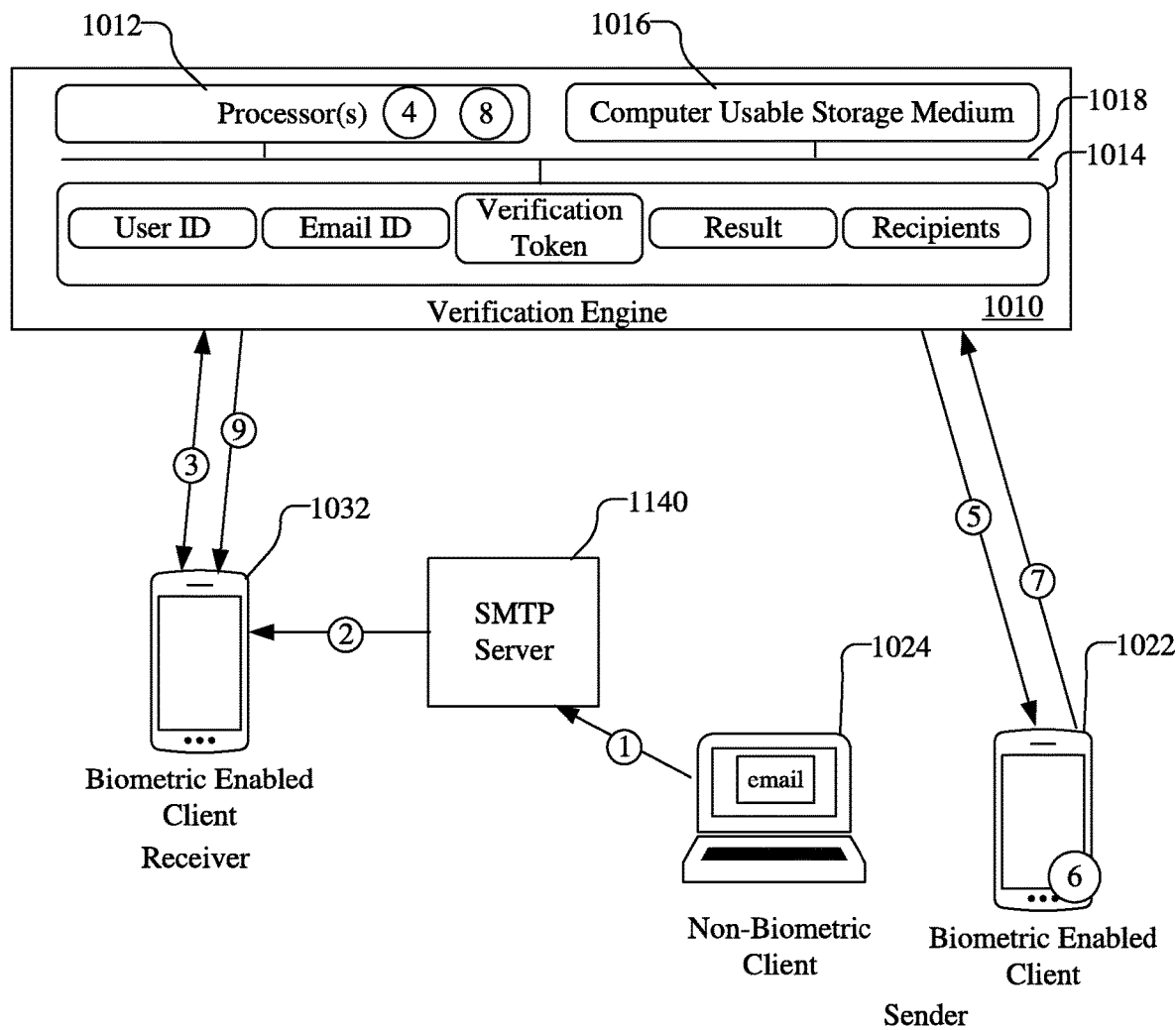
FIG. 13 illustrates operation of the verification system for Inbound Verification of an email by the Receiver.

FIG. 13 illustrates operation of the system 1000 for Inbound Verification of an email by the Receiver. In Inbound Verification, the Sender sends (1) an unverified email to the Receiver using conventional means, such as via the SMTP server 1140, which provides (2) the email to the Receiver. The Sender may send the email with a non-biometric client 1024, as illustrated in FIG. 13, or by a biometric-enabled client 1022 (but the email has not been verified before sending to the Receiver). The Receiver may receive the email with a biometric-enabled client 1032, as illustrated, or with a non-biometric client 1034 (shown in FIG. 10). Upon receipt of the email, the Receiver may send (3) a request to the verification engine 1010 to verify that the alleged Sender of the email, e.g., as indicated in the From field of the email, is, in fact, the person who sent the email, i.e., is the originator of the email.

In one implementation, the Receiver may request the verification engine 1010 for verification by forwarding the email to the verification engine 1010, e.g., via the SMTP server 1140 (not illustrated), and the verification engine 1010 may analyze (4) the email, e.g., parsing the email, to find the original alleged Sender of the email that is being forwarded to the verification engine 1010 by the Receiver client 1032. In some implementations, the email received by the Receiver may include an identifier that uniquely identifies the email, and the Receiver may request verification of the email by forwarding the identifier of the email to the verification engine 1010. For example, the email may be stored in a database associated with the identifier, and the verification may retrieve the email from the database using the identifier. Once the email is retrieved from the database, the verification engine 1010 may analyze (4) the email, e.g., parsing the email, to find the original alleged Sender of the email.

In another implementation, the Receiver client 1032 may have an Email Application that has a button to verify a selected email. The Receiver may select the email for verification and click the verification button, and the Email Application contacts the verification engine 1010 to initiate verification, sending the email to the verification engine 1010, which may be performed using data transfer through application specific protocols or via the SMTP server. The Email Application can also send a reference to the email, not the entire email itself, if the verification engine 1010 using that reference can resolve the reference to the exact email by accessing a data store that stores emails along with associated references. The verification engine 1010 may respond (3) with a Verification Token and then analyze (4) the email to be verified, e.g., parsing the email, to retrieve the Sender's email address. The Verification Token may be used to refer to the result once it is verified by the Sender.

The process may then operate similar to the Outbound Verification operation for a non-biometric client as discussed in FIG. 12, above. For example, the verification engine 1010 may analyze (4) the email to acquire the alleged Sender's User ID, e.g., by parsing the email to determine the alleged Sender's email address from the email, and looking up whether any biometric-enabled clients are associated with the User ID for the alleged Sender. If a biometric-enabled client is found associated with the User ID for the alleged Sender, the verification engine 1010 then sends (5) a request for biometric verification, which may include the email, to the associated biometric-enabled client 1022.

The biometric-enabled client 1022 presents the email to the alleged Sender for confirmation (6), e.g., asking the alleged Sender for confirmation that the alleged Sender is the originator of the email. The biometric-enabled client 1022 collects the alleged Sender's input of the confirmation. In addition, the biometric-enabled client 1022 biometrically verifies the alleged Sender against a previously enrolled identity-proofed biometric. The biometric-enabled client 1022 of the alleged Sender then sends (7) the result of the biometric verification, e.g., the verification of the biometrics (e.g., optionally encrypted with a cryptographic certificate as discussed above) or with the biometrics themselves, and the confirmation to the verification engine 1010. In some implementations, the biometric verification may serve as confirmation from the biometric-enabled client 1022. The verification engine 1010 then composes the data associated with relevant fields and stores the result of the verification in memory 1014, associating it with the Verification Token.

If the alleged Sender does not confirm sending the email, the verification engine 1010 may provide (9) warning to the Receiver client 1032, referencing the associated Verification Token. For example, if the alleged Sender does not respond within a specified time frame, the verification engine 1010 may provide an indication of no response and that further follow up, e.g., calling the sender directly, is necessary. If the alleged Sender denies sending the email, the verification engine 1010 provides a fraud alert to the Receiver client 1032, e.g., by responding to the verification request with a fraud alert, as well as other configured actions, such as sending the fraud alert through other communication mechanisms. In all cases, the verification engine also provides with these messages the associated Verification Token so that the Receiver client can distinguish between the different verification requests it is processing from each other.

The Receiver of an email may retrieve results for Outbound Verification or Inbound Verification for an email from the verification engine 1010 using a client, e.g., a non-biometric client 1034 or a biometric-enabled client 1032. For example, the Receiver may retrieve the results from the verification engine 1010, e.g., using a cloud-based portal or within an email application.

For example, a Receiver may log into a verification portal, which accesses the verification engine 1010, to view results of email verifications they have requested. In some embodiments, a Receiver may also view results of verifications of emails if they were included on the cc or bcc fields of the email. The verification engine 1010 may authenticate a Receiver using the verification portal using passwords. For increased security, the verification engine 1010 may use verification techniques as described herein to authenticate a Receiver using the verification portal to view results of email verifications.

For Inbound Verification, the verification engine 1010 may send notification, e.g., email, text message, etc., to Receivers that the status of a verification changed, along with the Verification Token referencing that verification. For Outbound Verification, the email received by the Receiver includes information related to the Verification Token, or the Verification Token itself, embedded in the email. Receivers in response can log into the verification portal to retrieve results, authenticating their identity using standard means or using an identity-proofed biometric. The verification portal retrieves from the verification engine 1010 all verifications that a Receiver has requested and/or verifications where the Receiver is included in the cc or bcc fields of the email. For example, the verification engine 1010 may use the Receiver's email address (as associated with the User ID for the Receiver) and compare the Receiver's email to the Recipients field stored in its database, e.g., memory 1014. For each email retrieved, the verification engine 1010 may examine the flag that is set if the Receiver requested that the email in question be verified. The verification engine 1010 then retrieves the results from the Result field stored in memory 1014 for all relevant entries, e.g., where the Receiver requested that the email be verified. The information from the Result field may then be displayed to the Receiver through the verification portal.

The Receiver may additionally or alternatively retrieve the results from the verification engine 1010 using an email application on the Receiver biometric-enabled client 1032 or non-biometric client 1034. For example, within the email application, the Receiver may be presented with the result of the request for verification of the email. In this case, the email application on the Receiver client interacts with the verification engine 1010 to retrieve the result of an email verification, e.g., at stage 9 shown in FIG. 13. The retrieval of the result may be initiated by the verification engine 1010 or by the email application on the Receiver client 1032.

If the retrieval of the result is initiated by the verification engine 1010, for example, after the Sender has verified the email (stage 7) and a result is available, the verification engine 1010 may send a message to the email application on the Receiver client 1032 referring to the email in question by its Verification Token and an indication of the status of the verification. The email application may then display an indicator of the result. For example, email application on the Receiver client 1032 may display a check mark against the email that was just verified, or present an appropriate warning flag if the email could not be verified within a specified time or an appropriate fraud flag if the alleged Sender of the email denied sending the email.

If the retrieval of the result was initiated by the email application on the Receiver client 1032, e.g., after a specified time (which may be user determined) or at the Receiver's request, the email application on the Receiver client 1032 may send to the verification engine 1010 the token for the verification that is related to a given email, e.g., received at stage 3 or received embedded within the email. The verification engine 1010 retrieves the result for that token from the Result field stored in memory 1014 and returns the result back to the email application on the Receiver client 1032. The email application may then display an indicator of the result of the verification, as discussed above.

In one implementation, e.g., where the Receiver is using a biometric-enabled client 1032 and the Sender used Outbound Verification using a biometric-enabled client 1022, the verification engine 1010 may verify the identity of the Receiver before presenting the email to the Receiver. For example, if the Sender sends an email from a biometric-enabled client 1022 and performs Outbound Verification, the client may encrypt the message, e.g., as described above. The email can be encrypted with a secret key generated by the verification engine that is then stored by the verification engine. The verification engine may also generate different secret keys for each Receiver, or may generate one key for all Receivers. Note that in an alternative implementation the one or more keys could be generated by the Sender's client and then provided to the verification engine for storage. The Receiver's biometric-enabled client 1032 receives the encrypted email whose Sender has already verified through their biometric-enabled client 1022. The Receiving biometric-enabled client 1032 may first verify the Receiver using the biometric capability of the biometric-enabled client 1032, utilizing identity-proofed biometrics. Once the Receiver is verified, then the Receiving biometric-enabled client 1032 may provide the result of the verification to the verification engine, in response to which the engine provides the secret key used to encrypt the email. The Receiving client can then use this secret key to decrypt the encrypted email and then display the decrypted email to the Receiver. In this way, email confidentiality may be enforced, as only legitimate Receivers are able to view the email. When the Receiver wishes to access the email via the verification portal, either the portal or the verification engine may request a BEC associated with the Receiver to verify the Receiver against an identity-proofed biometric. Once they are authenticated by that BEC by comparison against an identity-proofed biometric, that information is conveyed back to the verification engine, which retrieves the secret key associated with that Receiver, and provides it to the verification portal, which then uses it to decrypt the email. Note that in this case, the verification engine stores encrypted copies of the email in a data store, associating the Verification Token for that verification, along with the information about the one or more Receivers and associated encryption keys.

Email confidentiality may be enhanced still further by encrypting the email when the Sender biometric-enabled client 1032 sends the email. For example, the Sender biometric-enabled client 1032 may retrieve encryption keys from the verification engine 1010 after verification of an email and may encrypt the body of the email. The encrypted version of the email may be sent via standard methods, such as the SMTP server 1140, or may be sent to the verification engine 1010, which can forward the encrypted email to the Receiver. The email may contain the Verification Token to make retrieval simpler.

On receipt, the Receiver biometric-enabled client 1032 may verify the Receiver using biometrics, and sends the result of this verification to the verification engine 1010. The verification engine 1010 determines whether the Receiver of the email as specified by their email address has verified biometrically through the Receiver biometric-enabled client 1032, then the verification engine 1010 provides a decryption key for that email to the Receiver biometric-enabled client. The Receiver biometric-enabled client 1032 may then use the decryption key to decrypt the email and present the email to the Receiver. In this way, if the email is forwarded or acquired by others that are not on the Recipient list of the email (e.g., in the to, cc or bcc fields of the email, during transit or storage, these undesignated recipients will not be able to read the contents of the email since they will fail the biometric verification and, thus, will be unable to acquire the requisite decryption key from the verification engine 1010.

Figure 14:
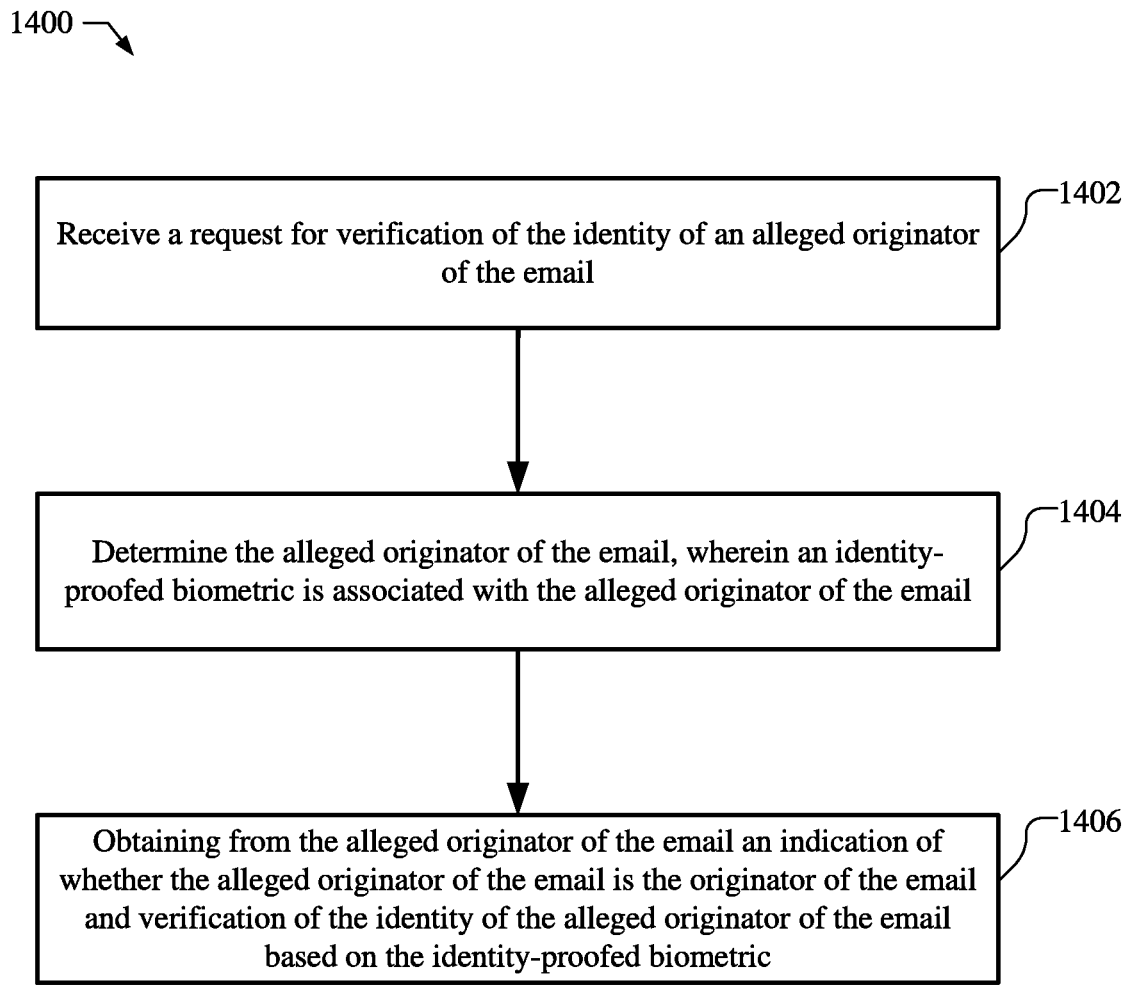
FIG. 14 is a flow chart illustrating a method for confirming an identity of an originator of an electronic mail (email) performed by a verification server.

FIG. 14 is a flow chart illustrating a method 1400 for confirming an identity of an originator of an electronic mail (email) performed by a verification server, such as the verification engine 1010 shown in FIGS. 10-13.

Figure 6:
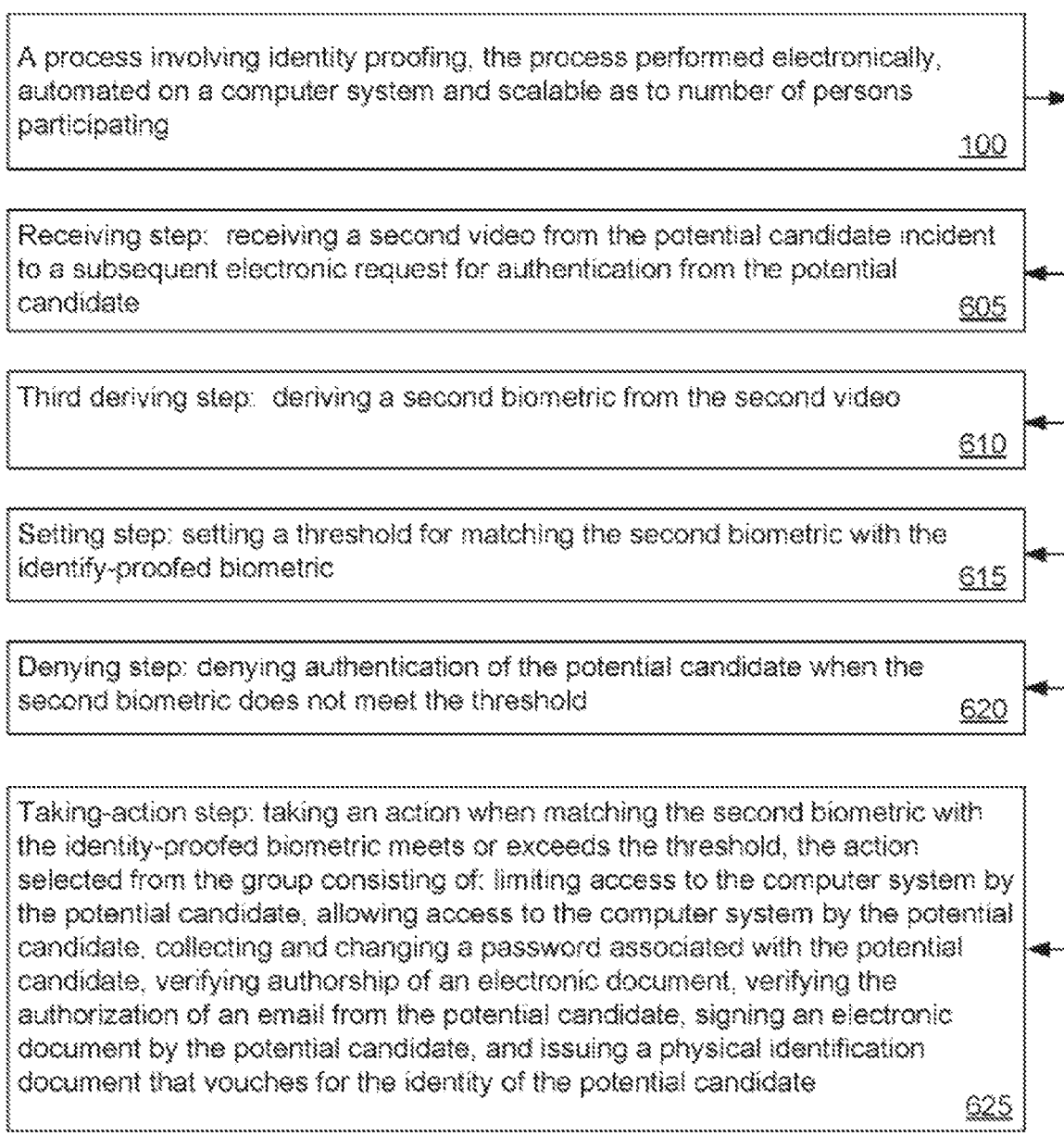
FIG. 6 is a block diagram showing optional additional steps to the steps of FIG. 1, the added steps involving subsequent requests for identity proofing.
Figure 7:
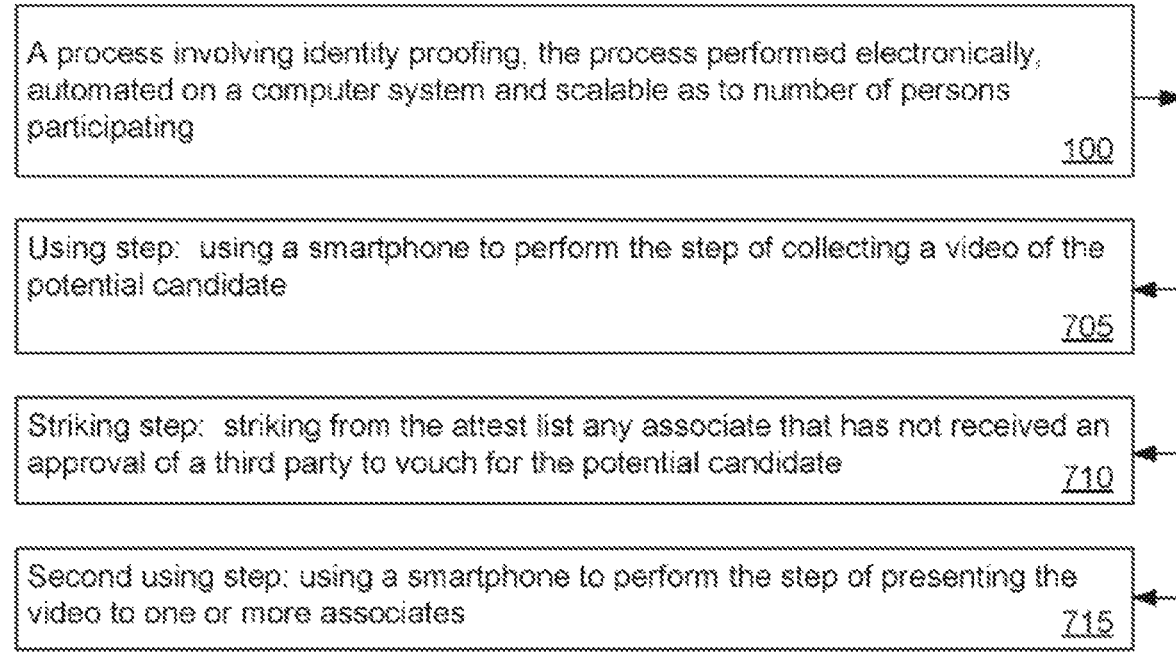
FIG. 7 is a block diagram showing optional additional steps to the steps of FIG. 1, the added steps involving use of a smartphone.

At block 1402, the verification server receives a request for verification of the identity of an alleged originator of the email, e.g., as discussed with respect to inter alia phase 2 and step 605 and step 625 of FIG. 6, stages 2 and/or 4 of FIG. 11, stage 1 of FIG. 12, or stage 3 of FIG. 13.

At block 1404, the verification server determines the alleged originator of the email, wherein an identity-proofed biometric is associated with the alleged originator of the email, e.g., as discussed with respect to inter alia phase 2 and step 610 and step 625 of FIG. 6, stages 2 and/or 4 of FIG. 11, stage 2 of FIG. 12, or stage 4 of FIG. 13.

At block 1406, the verification server obtains from the alleged originator of the email an indication of whether the alleged originator of the email is the originator of the email and verification of the identity of the alleged originator of the email based on the identity-proofed biometric, e.g., as discussed with respect to inter alia phase 2 and steps 615, 620, and 625 of FIG. 6, stage 4 of FIG. 11, stage 5 of FIG. 12, or stage 7 of FIG. 13.

In one implementation, for example, the request for verification of the identity of an alleged originator of the email may be received from the receiver of the email and comprises the email, and wherein the determining the alleged originator of the email comprises parsing the email to determine the alleged sender of the email, e.g., as illustrated in FIG. 13. For example, the email from the receiver of the email comprises receiving the email as forwarded by the receiver or via an application on a receiver client. The verification server may determine a biometric-enabled client associated with the alleged sender and send a request for verification of the email to the biometric-enabled client. The indication of whether the alleged originator of the email is the originator of the email and verification of the identity of the alleged originator of the email based on the identity-proofed biometric may be in response to the request for verification of the email. In one implementation, the verification server may send the receiver verification of whether the alleged sender of the email is the originator of the email. In another implementation, the verification server may provide the receiver with access to the verification server from which the receiver receives verification of whether the alleged sender of the email is the originator of the email.

In another implementation, the request for verification of the identity of an alleged originator of the email is received from the originator of the email, e.g., from the sender of the email before the email is sent to the receiver, as illustrated in FIGS. 11 and 12. For example, in one implementation, the request for verification of the identity of an alleged originator of the email received from the originator of the email may comprise the email, wherein the determining the alleged originator of the email comprises parsing the email to determine the alleged sender of the email. For example, as illustrated in FIG. 12, the verification server may further determine a biometric-enabled client associated with the alleged sender and send a request for verification of the email to the biometric-enabled client, wherein the indication of whether the alleged originator of the email is the originator of the email and verification of the identity of the alleged originator of the email based on the identity-proofed biometric is in response to the request for verification of the email.

In another example, e.g., as illustrated in FIG. 11, the verification server may send to the originator of the email a verification token for identification of the email, and the indication of whether the alleged originator of the email is the originator of the email and verification of the identity of the alleged originator of the email based on the identity-proofed biometric is received from the originator of the email with the verification token.

In another example, e.g., as illustrated in FIG. 11, the indication of whether the alleged originator of the email is the originator of the email and verification of the identity of the alleged originator of the email based on the identity-proofed biometric is received from the originator of the email with the email.

In some implementations, e.g., as illustrated in FIGS. 11 and 12, the verification server may send the email with an indication of verification of the identity of the originator of the email. In some implementations, e.g., as illustrated in FIGS. 11 and 12, the verification server may send an indication of verification of the identity of the originator of the email to the originator of the email, wherein the originator of the email sends the email with the indication of verification of the identity of the originator of the email.

In an implementation, the verification server may provide a receiver of the email with access to the verification server from which the receiver receives verification of the identity of the originator of the email.

In an implementation, the verification server the email may be received by the receiver in an encrypted form. The verification engine may obtain verification of the receiver identity based on an identity-proofed biometric associated with the receiver; and may provide a decryption key for the email to the receiver based on the verification of the receiver identity.

Figure 15:
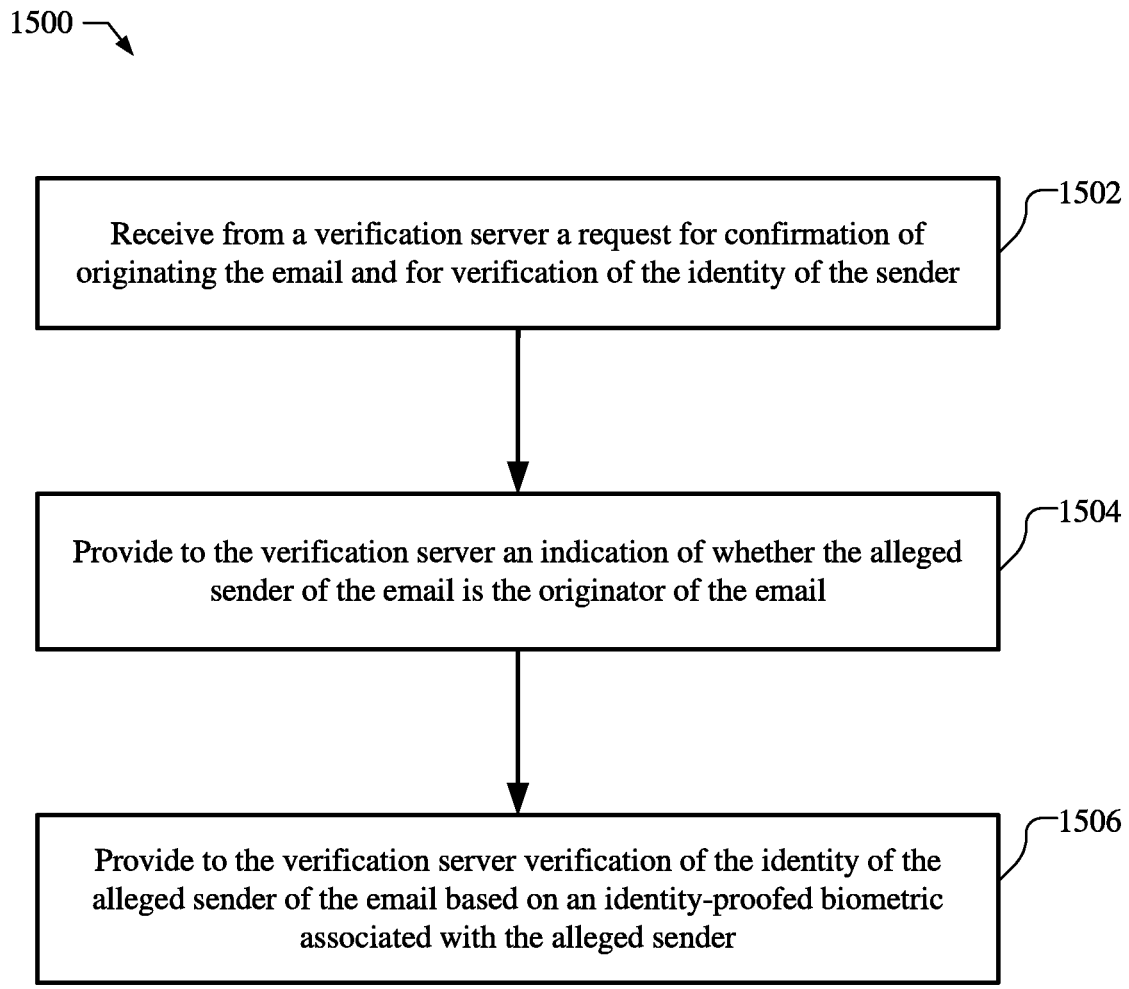
FIG. 15 is a flow chart illustrating a method for confirming an identity of sender of an electronic mail (email) performed by a biometric-enabled client associated with an alleged sender of the email.

FIG. 15 is a flow chart illustrating a method 1500 for confirming an identity of sender of an electronic mail (email) performed by a biometric-enabled client associated with an alleged sender of the email, such as with the biometric-enabled client 1032 shown in FIGS. 10-13.

At block 1502, the biometric-enabled client receives from a verification server a request for confirmation of originating the email and for verification of the identity of the sender, e.g., as discussed with respect to inter alia phase 2 and step 610 and step 625 of FIG. 6, stage 2 of FIG. 11, stage 3 of FIG. 12, or stage 5 of FIG. 13.

At block 1504, the biometric-enabled client provides to the verification server an indication of whether the alleged sender of the email is the originator of the email, e.g., as discussed with respect to inter alia phase 2 and step 615 and step 625 of FIG. 6, stage 4 of FIG. 11, stage 5 of FIG. 12, or stage 7 of FIG. 13.

At block 1506, the biometric-enabled client provides to the verification server verification of the identity of the alleged sender of the email based on an identity-proofed biometric associated with the alleged sender, e.g., as discussed with respect to inter alia phase 2 and step 615 and step 625 of FIG. 6, stage 4 of FIG. 11, stage 5 of FIG. 12, or stage 7 of FIG. 13.

In one implementation, for example, the verification server received a request to verify the identity of the sender of the email from the receiver of the email, e.g., as discussed in FIG. 13.

In another implementation, e.g., as illustrated in FIGS. 11 and 12, the biometric-enabled client sends to the verification server a request to verify the identity of the sender of the email from the sender of the email. In one example, the verification server may send the email with an indication of verification of the identity of the alleged sender of the email to a recipient of the email. In another example, the biometric-enabled client may receive from the verification server an indication of the verification of the identity of the alleged sender of the email, and may send the email to a recipient of the email with the indication of the verification of the identity of the alleged sender of the email.

In one implementation, the identity-proofed biometric may be stored in the biometric-enabled client.

In one implementation, the identity-proofed biometric may be stored in the verification server and the biometric-enabled client may provide the verification of the identity of the alleged sender of the email based on an identity-proofed biometric associated with the alleged sender by sending one or more biometrics from the biometric enabled client to the verification server.

The above-described embodiments including the drawings diagrammatically display examples of the invention and merely provide illustrations of the invention. Other embodiments will be obvious to those skilled in the art. Thus, the scope of the invention is determined by the appended claims and their legal equivalents rather than by the examples given.

What is claimed is:

1. A method for confirming an identity of an originator of an electronic mail (email) performed by a verification server, the method comprising:
   receiving, from a receiver of the email, a request for verification of the identity of an alleged originator of the email;
   determining the alleged originator of the email, wherein an identity-proofed biometric is associated with the alleged originator of the email;
   sending a request for biometric verification of the email to the alleged originator of the email;
   receiving in response to the request for biometric verification of the email from the alleged originator of the email an indication of whether the alleged originator of the email is the originator of the email and verification of the identity of the alleged originator of the email based on the identity-proofed biometric; and
   sending, to the receiver, verification of whether the alleged originator of the email is the originator of the email.

2. The method of claim 1, wherein the request for verification of the identity of the alleged originator of the email comprises at least one of the email or an identifier of the email, and wherein the determining the alleged originator of the email comprises parsing the email to determine the alleged originator of the email.

3. The method of claim 2, wherein receiving the email from the receiver of the email comprises receiving the email as forwarded by the receiver or via an application on a receiver client.

4. The method of claim 2, further comprising determining a biometric-enabled client associated with the alleged originator and wherein the request for biometric verification of the email is sent to the biometric-enabled client.

5. The method of claim 2, further comprising providing the receiver with access to the verification server from which the receiver receives verification of whether the alleged originator of the email is the originator of the email.

6. A method for confirming an identity of an originator of an electronic mail (email) performed by a verification server, the method comprising:
   receiving a request for verification of the identity of an alleged originator of the email from the originator of the email;
   determining the alleged originator of the email, wherein an identity-proofed biometric is associated with the alleged originator of the email;
   obtaining from the alleged originator of the email an indication of whether the alleged originator of the email is the originator of the email and verification of the identity of the alleged originator of the email based on the identity-proofed biometric; and
   providing for a receiver of the email an indication of verification of the identity of the originator of the email.

7. The method of claim 6, wherein the request for verification of the identity of the alleged originator of the email from the originator of the email comprises at least one of the email or an identifier of the email, wherein the determining the alleged originator of the email comprises parsing the email to determine the alleged originator of the email further comprising:
   determining a biometric-enabled client associated with the alleged originator; and
   sending a request for verification of the email to the biometric-enabled client, wherein the indication of whether the alleged originator of the email is the originator of the email and verification of the identity of the alleged originator of the email based on the identity-proofed biometric is in response to the request for verification of the email.

8. The method of claim 6, further comprising:
   sending, to the originator of the email, a verification token for identification of the email;
   wherein the indication of whether the alleged originator of the email is the originator of the email and verification of the identity of the alleged originator of the email based on the identity-proofed biometric is received from the originator of the email with the verification token.

9. The method of claim 6, wherein the indication of whether the alleged originator of the email is the originator of the email and verification of the identity of the alleged originator of the email based on the identity-proofed biometric is received from the originator of the email with the email.

10. The method of claim 6, wherein sending for the receiver of the email an indication of verification of the identity of the originator of the email comprises sending the email with an indication of verification of the identity of the originator of the email.

11. The method of claim 6, wherein sending for the receiver of the email an indication of verification of the identity of the originator of the email comprises sending the indication of verification of the identity of the originator of the email to the originator of the email, wherein the originator of the email sends the email to the receiver with the indication of verification of the identity of the originator of the email.

12. The method of claim 6, further comprising providing the receiver of the email with access to the verification server from which the receiver receives verification of the identity of the originator of the email.

13. The method of claim 6, wherein the receiver receives the email encrypted, the method further comprising:
obtaining verification of an identity of the receiver based on an identity-proofed biometric associated with the receiver; and
providing a decryption key for the email to the receiver based on the verification of the identity of the receiver.

14. A method for confirming an identity of a sender of an electronic mail (email) performed by a biometric-enabled client associated with an alleged sender of the email, the method comprising:
receiving a request for confirmation of originating the email and for verification of the identity of the sender from a verification server in response to a request to verify the identity of the sender of the email received from a receiver of the email or the sender of the email;
providing, to the verification server, an indication of whether the alleged sender of the email is an originator of the email; and
providing, to the verification server, verification of the identity of the alleged sender of the email based on an identity-proofed biometric associated with the alleged sender.

15. The method of claim 14, wherein the verification server sends the email with an indication of verification of the identity of the alleged sender of the email to a recipient of the email.

16. The method of claim 14, further comprising:
receiving, from the verification, server an indication of the verification of the identity of the alleged sender of the email; and
sending the email to a recipient of the email with the indication of the verification of the identity of the alleged sender of the email.

17. The method of claim 14, wherein the identity-proofed biometric is stored in the biometric-enabled client.

18. The method of claim 14, wherein the identity-proofed biometric is stored in the verification server and providing the verification of the identity of the alleged sender of the email based on an identity-proofed biometric associated with the alleged sender comprises sending one or more biometrics from the biometric-enabled client to the verification server.

19. A process for confirming an identity of a user, the process comprising:
acquiring data from a mobile device associated with the user, the data used for verifying the identity of the user;
creating an attest list for the user, the attest list comprising a group of persons in a directory that have been approved to confirm the identity of the user;
presenting an initial set of video data of the user to one or more persons from the attest list for the user for confirmation of the identity of the user;
obtaining confirmation of the identity of the user from the one or more persons from the attest list based on reviewing the initial set of video data of the user;
acquiring, by a verification server, a new set of video data from the mobile device associated with the user, the new set of video data used for verifying the identity of the user, wherein the identity of the user was previously confirmed based on the initial set of video data;
acquiring, by the verification server, the initial set of video data with which the identity of the user was previously confirmed;
providing, by the verification server, the initial set of video data and the new set of video data to an administrator for comparison; and
receiving, by the verification server, an indication from the administrator whether the identity of the user is confirmed based on the comparison of the initial set of video data and the new set of video data by the administrator.

20. A process for confirming an identity of a user, the process comprising:
acquiring data from a mobile device associated with the user, the data used for verifying the identity of the user, wherein the user is included in a first group in a directory;
creating an attest list for the user, the attest list comprising a second group of persons in the directory that have been approved to confirm the identity of anyone in the first group in the directory, wherein the first group and the second group are different groups in the directory;
presenting a video of the user to one or more persons in the second group for confirmation of the identity of the user;
obtaining confirmation of the identity of the user from the one or more persons in the second group based on reviewing the video of the user;
generating an identifying indicator for the user based on confirmation of the identity of the user from the one or more persons in the second group; and
storing the identifying indicator for the user with the attest list comprising the one or more persons in the second group that confirmed the identity of the user.

* * * * *